US011442849B1

(12) United States Patent
Colwell et al.

(10) Patent No.: US 11,442,849 B1
(45) Date of Patent: *Sep. 13, 2022

(54) SYSTEM FOR ASSISTING IN ASSESSMENT AND MITIGATION OF DATA NETWORK OPERATIONS

(71) Applicant: HEADSPIN, INC., Palo Alto, CA (US)

(72) Inventors: Brien Colwell, Redwood City, CA (US); Manish Lachwani, Los Altos, CA (US); Marius Nita, San Mateo, CA (US); Benjamin Lichtner, San Francisco, CA (US); Shawn Weiland, Berkeley, CA (US)

(73) Assignee: HEADSPIN, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,193

(22) Filed: Feb. 23, 2021

Related U.S. Application Data

(63) Continuation of application No. 15/619,181, filed on Jun. 9, 2017, now Pat. No. 11,144,441.

(60) Provisional application No. 62/357,008, filed on Jun. 30, 2016.

(51) Int. Cl.
*G06F 11/36* (2006.01)

(52) U.S. Cl.
CPC .............................. *G06F 11/3692* (2013.01)

(58) Field of Classification Search
CPC .... G06F 11/36; G06F 11/3692; G06F 11/008; G06F 11/0709; G06F 11/0769
See application file for complete search history.

(56) References Cited

U.S. PATENT DOCUMENTS

| 9,641,650 B2* | 5/2017 | Virkki | H04L 69/16 |
| 9,681,318 B1* | 6/2017 | Lachwani | H04W 4/24 |
| 9,749,888 B1* | 8/2017 | Colwell | H04L 43/08 |
| 2001/0049263 A1* | 12/2001 | Zhang | G06F 8/65 |
| | | | 455/67.11 |
| 2005/0114706 A1* | 5/2005 | DeStefano | H04L 63/1425 |
| | | | 726/4 |
| 2006/0195894 A1* | 8/2006 | Nita | G06F 11/3664 |
| | | | 726/11 |
| 2007/0121674 A1* | 5/2007 | Chen | G06Q 10/04 |
| | | | 370/468 |

(Continued)

*Primary Examiner* — Kamini B Patel
(74) *Attorney, Agent, or Firm* — Lindauer Law, PLLC

(57) ABSTRACT

Mobile devices executing applications utilize data services worldwide, with issues involving the transfer of data on the network impacting the operation and user experience of those applications. Network data is acquired from a mobile computing device during communication and processed to determine occurrence of a burst which is representative of elements in the network data that are determined to be causally related. Bursts are analyzed, and those associated with poor performance are presented in a user interface. The user interface provides impact information about the effect the burst had on operation of the application. The user interface may provide suggestions to mitigate the poor performance. If no problem is determined by the system, but the user believes a problem to have occurred, user input is collected and used to trigger a workflow to analyze the burst. Subsequent results of this analysis are returned to the user via the user interface.

20 Claims, 19 Drawing Sheets

(56) References Cited

U.S. PATENT DOCUMENTS

| | | | | |
|---|---|---|---|---|
| 2014/0359139 A1* | 12/2014 | Efrati | .................... | H04M 3/58 |
| | | | | 709/227 |
| 2015/0237173 A1* | 8/2015 | Virkki | ................ | H04L 43/0864 |
| | | | | 709/238 |
| 2015/0370304 A1* | 12/2015 | Abu Salah | ............ | G06F 1/3206 |
| | | | | 713/322 |

* cited by examiner

SYSTEM FOR ASSISTING IN ASSESSMENT AND MITIGATION OF DATA NETWORK OPERATIONS

PRIORITY

This application is a continuation of, and claims priority to, U.S. patent application Ser. No. 15/619,181, filed on Jun. 9, 2017, entitled "System for Assisting in Assessment and Mitigation of Data Network Operations", which is hereby incorporated by reference in its entirety.

Application Ser. No. 15/619,181 claims priority to and the benefit of U.S. Provisional Patent Application No. 62/357,008, entitled "System for Assisting in Assessment and Mitigation of Data Network Operations" filed Jun. 30, 2016. Application 62/357,008 is incorporated by reference herein in its entirety.

COMPUTER PROGRAM LISTING

A computer program listing is submitted with this disclosure and is hereby incorporated by reference for all that it contains.

INCORPORATION BY REFERENCE

U.S. patent application Ser. No. 14/850,798, now U.S. Pat. No. 9,681,318, filed Sep. 10, 2015, and titled "System for Application Test" is hereby incorporated by reference in its entirety.

U.S. patent application Ser. No. 14/976,480, now U.S. Pat. No. 9,749,888, filed Dec. 21, 2015, and titled "System for Network Characteristic Assessment" is hereby incorporated by reference in its entirety.

U.S. Provisional Patent Application 62/298,820 filed Feb. 23, 2016, and titled "Adaptive Application Behavior Based on Assessed Network Characteristics" is hereby incorporated by reference in its entirety.

U.S. patent application Ser. No. 15/439,755, now U.S. Pat. No. 10,178,569, filed Feb. 22, 2017, and titled "Adaptive Application Behavior Based on Assessed Network Characteristics" is hereby incorporated by reference in its entirety.

BACKGROUND

Mobile devices executing applications that utilize networks during operation to transfer data may experience failures or otherwise produce adverse user experiences as a result of network conditions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
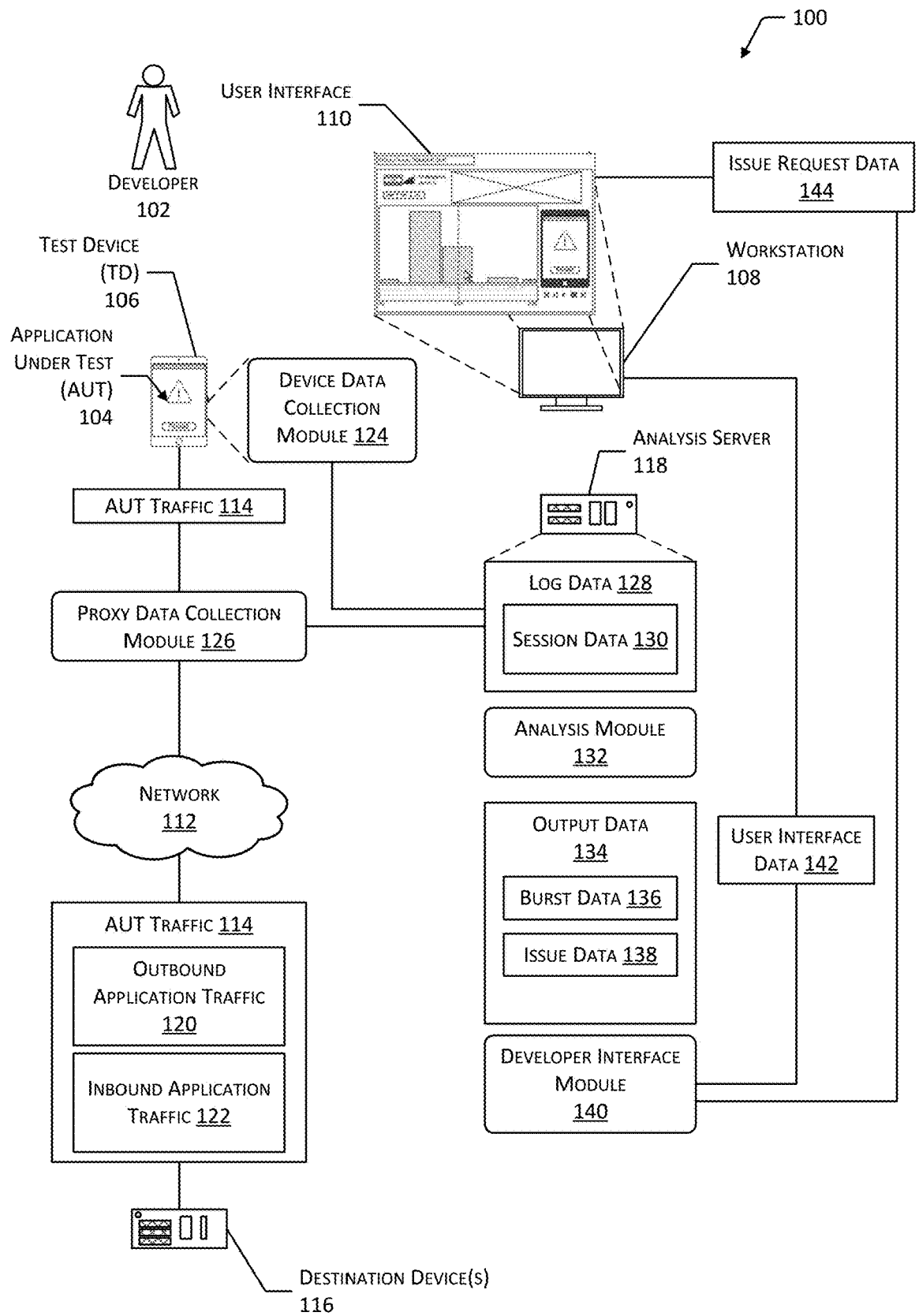
FIG. 1 depicts a system for providing a user interface for determining and presenting information about performance of an application under test, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Computing devices may execute an application to provide various functions. These computing devices may include, but are not limited to, smartphones, laptops, tablet computers, embedded devices, network-enabled devices, wearable computing devices, appliances, automobiles, aircraft, and so forth. Functions provided by the application may involve retrieval of data, presentation of that data to a user, processing of data, and so forth.

Some applications may communicate with one or more external devices, such as a server, using a network. For example, a navigation application may use the network to send location information to an application server that is indicative of a position of a mobile device and receive map data to present on a display of the mobile device. Problems with this communication may result in the application failing to perform the desired function, error messages, improper operation, and so forth. Continuing the example above, a long latency or delay in receiving the map data may cause the application on the mobile device to pause, present an error to the user, and so forth. These problems may result in an adverse user experience. For example, the user may discontinue using the application because of these problems.

Some problems that the application may encounter while using the network may not be immediately perceived by the user. For example, the application may drain the battery of the mobile device more quickly by resending data due to communication problems with the network or inefficient operation.

The network used by the computing device to access the external device may include a wireless wide area network (WWAN), such as a wireless cellular data network (WCDN). For example, the mobile device may comprise a smartphone that accesses a WCDN provided by a telecommunication company. By using the WCDN, the smartphone is able to send and receive data to other devices, such as those accessible on the Internet.

Performance of the network used by the computing device executing the application may be variable due to many factors. These factors may include the geographic location (geolocation) of where the computing device is located while communicating with the network, the network access point in use, congestion at the network access point, congestion at the interconnect that connects the WCDN to another network such as the Internet, capability of the network access point, and so forth. For example, during a morning commute, many users may be streaming video content to their mobile devices, resulting in overall network congestion. In another example, the telecommunication company may have some network access points that support 3G data transmission and are relatively more congested while other network access points are able to support 4G data transmission and are relatively less congested.

Traditionally, analysis of information about the communication of an application has involved significant amounts of effort by a developer. For example, a packet capture waterfall provides a bewildering set of information for a developer to consider. Further complicating this and other presentations are the difficulties in determining if various activities in a stream of communication traffic between the application under test and other servers are related to one another. These traditional systems for processing and presenting information about the performance of an application thus result in overly complex and difficult to use systems with a significant training overhead, and may be insufficient to assist even a highly experienced user in determining how operation of an application could be improved.

Described in this disclosure are techniques for processing and presenting information including, and associated with, data traffic ("traffic") between an application under test ("AUT") and one or more destination devices. Log data associated with execution of the application during testing is obtained and processed to generate burst data. The log data may include session data obtained from a proxy device that intercepts the traffic between the AUT and the destination device(s). The log data may include video capture data representative of images that were or would be presented on a display device of the test device executing the AUT. The log data may also include information about the condition of the test device, such as memory usage, processor usage, user input events, and so forth.

The log data is processed to determine output data, such as burst data and issue data. A burst comprises one or more activities in the log data that are deemed to be causally related. Two activities may be deemed causally related when one activity triggers another activity, or is otherwise associated with another activity. Activities may include the transfer of data on the network, receipt of user input, output generated by the application, and so forth. For example, the session data obtained from a proxy may be processed to generate burst data indicative of a burst. The determination of the causal relationship may include a determination that two or more activities are not regular repeating activities, take place during an overlapping time, occur within a threshold time window of one another, and so forth. Some activities, such as particular types of messages, may be further arranged into message groups which are deemed inseparable. For example, a connect message, data request, and response may be deemed a single message group. During further processing, the message group may be used to maintain coherent data.

A user interface may be presented to a user such as an application developer ("developer"). The user interface may present information about the bursts. For example, a chart may be provided that depicts burst indicators. In one implementation each burst indicator may comprise a rectangle with a width along a horizontal axis that is based on a union of times of the activities in the burst while the height along a vertical axis is a sum of the data transferred by the activities of the burst. In another implementation, each burst indicator may comprise a rectangle with a width along a horizontal axis that is based on the real time elapsed while the height along a vertical axis is a union of the impact times. Bursts may be arranged in time sequence, such that later bursts appear to the right of earlier bursts. The information presented in the user interface may be synchronized to a timeline.

The user interface may also present video capture data. The video capture data is representative of images that were, or would be, presented on a display device of the test device executing the AUT. For example, the output for display on the screen of a test device comprising a smart phone may be captured as a video file. A time indicator may be presented in the user interface that indicates the portion of the log data that corresponds to the image of the video capture data. For example, during playback of the video capture data, the time indicator may move from left to right, sweeping through the bursts that are presented in the user interface.

The log data associated with the burst data may be further processed to generate issue data. For example, the session data obtained from the proxy may be used to generate the issue data. Issue data is indicative of some aspect of the log data that exhibits one or more metrics that exceed a predetermined threshold. For example, an issue may be deemed present when the data transfer of a particular file exceeds a threshold amount of time. Analysis rule data may be stored that includes one or more rules for assessing activities. One or more thresholds for these rules may be specified in analysis threshold data. For example, an analysis rule may compare the time spent by an activity, such as transferring an image file, to a threshold maximum time value. Continuing the example, the session data may be processed to determine that an image transfer took 600 ms to complete, which is then tested using the analysis rules and a threshold of a 200 ms maximum analysis to generate issue data indicative of the image taking too long to load.

The issue data may be accessed in the user interface by selecting a particular burst. For example, a user click or touch event associated with a particular burst may result in presentation in the user interface of the issue data of that burst.

The issue data may include information such as an issue description indicative of the nature of the issue. Some brief advice on mitigating the issue may also be included in the issue data. Continuing the earlier example, the issue description may be the test "Issue at 1:13:03 Excessive Image Load Time. Consider downsampling the source image".

Impact data may also be presented in the user interface. The impact data may indicate the amount of time that a particular issue consumed. This may be total time for the issue, or amount of time above a specified threshold value. For example, the impact data may indicate that the image load time was "2.23 seconds" indicating the total time for that issue.

The issue data may include explanation data. The explanation data provides more detailed information about the issue. The explanation data may comprise rich text, hyperlinks, and so forth providing more comprehensive explanations, code examples, and so forth. For example, the explanation data may comprise text that describes what the recommended threshold maximum time for image load is, why downsampling is advantageous, and contain links to examples on how to downsample.

In some situations, the developer may detect behavior that is not deemed to be acceptable, but for which no issue data has been identified. The user interface may present an issue request control that, when activated, results in further analysis of at least a portion of the log data. For example, an issue request may be generated that includes log data associated with a burst that was selected at the time of activation of the issue request control. The issue request may be processed by one or more additional systems, such as a machine learning system, one or more human operators, and so forth to generate new analysis rules or modify existing analysis rules. Once the analysis rules have been added or modified, the burst may be re-processed to generate issue data.

During operation, the user may access the user interface to observe the performance of the application as recorded in the video capture data while also observing the bursts or issues occurring at particular times. In some implementations where source code for the application is accessible, the user may be presented with at least a portion of the source code associated with a particular issue. For example, the system described herein may operate in conjunction with an integrated development environment ("IDE") to allow the developer to quickly and effectively address issues in the source code of the AUT.

By using the system described in this disclosure, the developer is able to quickly and easily assess the performance of an application under test and improve the performance thereof with respect to those activities that involve the transfer of data on a network. The user interface presents information about bursts, which aggregates the data in a useful format and provides information about larger scale effects of the network on performance. The user interface may then be used to present additional detail about issues, including explanations and suggestions for improving performance. As a result, performance of the application may improve, efficiency of the use of the network may improve, and so forth.

FIG. 1 depicts a system 100 for providing a user interface for determining and presenting information about performance of an application under test, according to one implementation.

A developer 102 may be an individual, group of individuals, or entity that is tasked with creating a new application, maintaining an existing application, re-factoring an existing application, and so forth. The developer 102 may be working on an application under test (AUT) 104. The AUT 104 may be executed on a computing device such as a test device (TD) 106, a workstation 108, and so forth. For example, the TD 106 may include, but is not limited to, smartphones, laptops, tablet computers, embedded devices, network-accessible devices, wearable computing devices, appliances, automobiles, aircraft, and so forth. The workstation 108 may comprise a laptop, desktop computer, tablet computer, smartphone, and so forth.

The AUT 104 may be an application that is at any stage in a development or maintenance lifecycle. For example, the AUT 104 may comprise an alpha (or prerelease) version of software, or may comprise a previously released production version that is undergoing further testing.

The workstation 108 may include an integrated development environment (IDE) to facilitate the creation and editing of program code, debugging, compiling, and so forth. In some implementations, the workstation 108 may comprise an emulator or simulator that is designed to execute the AUT 104 as if it were executing on another piece of hardware, under a different operating system, and so forth.

The developer 102 may test the AUT 104 to determine issues associated with use of the AUT 104. These issues may include some functionality of the AUT 104 is not operating properly, using too many resources, taking too long to complete, and so forth. Once those problems have been determined, they may be mitigated. For example, the developer 102 may change the program code of the AUT 104 to remedy the problem. The developer 102 may use the techniques described below to determine at least some of the problems associated with operation of the AUT 104.

To facilitate the work of the developer 102, the user interface 110 may be presented using the workstation 108. The user interface 110 provides information about the operation of the AUT 104 during testing. Details about the user interface 110 are presented below.

One or more of the TD 106 or the workstation 108 may be connected to a network 112. The network 112 may, in turn, be connected to or be part of a larger network. For example, the network 112 may comprise a local area network (LAN) connected to the Internet. The connection used by the TD 106 or the workstation 108 may include, but is not limited to, a wired Ethernet connection, a wireless local area network (WLAN) connection such as Wi-Fi, and so forth. For example, the TD 106 may connect to a local Wi-Fi access point that is connected via Ethernet cable to a router. The router, in turn, is connected to a cable modem that provides connectivity to the Internet.

During operation, the AUT 104 may rely on access to an external resource, such as a destination device 116. For example, the AUT 104 may comprise a social networking application that sends data generated by a user and retrieves for presentation information from a server. As a result, in some implementations, the AUT 104 may require access to the destination device 116 for normal operation.

A single destination device 116 is depicted for ease of illustration and not necessarily as a limitation. For example, the AUT 104 may exchange AUT traffic 114 with many different destination devices 116 during operation. For example, the AUT 104 may communicate with a number of different destination devices 116 during the course of operation.

The AUT 104 may generate AUT traffic 114 that is exchanged with one or more of the destination devices 116 during operation. Traditionally, the AUT traffic 114 generated by the TD 106 would be sent to the network 112 and onto the destination device 116. As described below, in some implementations a proxy may be used to transfer the AUT traffic 114 to and from a proxy access device that is located at a different geolocation. This allows for testing of the AUT 104 as if it were operating at a different geolocation and using a desired network 112 at that location. For example, the proxy may be used to test the AUT 104 that is executing on the TD 106 in San Jose, Calif., as if the TD 106 was located in Bangalore, India.

To provide the functionality described herein, the developer 102 may incorporate a software development kit (SDK) into the AUT 104. For example, at compile time, the SDK may be included into the compiled AUT 104. In other implementations, techniques other than an SDK may be used to provide the functionality described herein. For example, lines of computer code that provide the functionality of at least a portion of the SDK may be incorporated into the code base of the AUT 104. In other implementations, the SDK may be omitted from the AUT 104.

The AUT 104 may be in communication with an analysis server 118. The analysis server 118 is used to generate the information that presents the user interface 110. The analysis server 118 may receive at least a portion of the AUT traffic 114 for analysis. The AUT traffic 114 may include outbound application traffic 120 and inbound application traffic 122. The outbound application traffic 120 may comprise data that is sent from the AUT 104 to the destination device 116. The inbound application traffic 122 may comprise data that is sent from the destination device 116 to the AUT 104.

During operation, the AUT 104 may be configured to direct the outbound application traffic 120 to a proxy executing on a proxy host device that is associated with a selected proxy access device. The proxy in turn transfers the outbound application traffic 120 from the TD 106 to the proxy access device, which then sends the outbound application traffic 120 to a second network 112(2). The second network 112(2) may then send the outbound application traffic 120 to the destination device 116. Inbound application traffic 122 from the destination device 116 may follow the reverse path, eventually arriving at the TD 106.

The analysis server 118 may use one or more device data collection modules 124 or proxy data collection modules 126 to acquire log data 128. The AUT 104 may include or be in communication with the device data collection module 124 that is executing at least in part on the TD 106. For example, the AUT 104 may include an SDK that includes the device data collection module 124. In other implementations, the AUT 104 may be executing device data collection modules 124 as standalone applications, as part of the operating system, and so forth. The proxy data collection module 126 is configured to intercept at least a portion of the AUT traffic 114 and provide information based at least in part on that AUT traffic 114 as log data 128 to the analysis server 118. For example, the proxy data collection module 128 may execute on the TD 106, or may be executing on another device such as a proxy host device, router, and so forth.

The log data 128 includes session data 130. The session data 130 may include "breadcrumb" data, information associated with operation of the AUT 104, operation of any proxy host devices, proxy access devices, packet capture of data transferred to the destination devices 116 during operation, and so forth. The session data 130 includes information about one or more activities that took place during a testing session. For example, the activities may include data transfers between the TD 106 and the destination device 116. The breadcrumb data may include, for a particular instant or interval of time, one or more of: a current page on a website, type of network that the proxy access device is connected to, quantity of data received, quantity of data transmitted, latency to the destination device 116, data throughput, received signal strength, transmit power, cost associated with data transfer on the second network 112(2), and so forth. For example, the breadcrumb data may indicate that the AUT 104 was connected at timestamp 201606092312030097 to webpage http://www.example.com/main.html using a 3G network connection with a received signal strength of 14 dBm, a transmit power of 7 dBm, data throughput of 400 Kbps, and so forth. The session data 130 is thus the product of the AUT 104 operating on a real-world network 112 using a communication interface, such as cellular modem, at a particular geolocation. The resulting session data 130 is representative of the real world, including the complexities and nuances associated therewith.

The log data 128 may include other information that is described below. The video capture data is representative of images that were, or would be, presented on a display device of the test device 106 executing the AUT 104. For example, the output for display on the screen of a test device 106 comprising a smart phone may be captured as a video file. For example, the log data 128 may include video capture data comprising video of a display of the TD 106 while the AUT 104 is being tested.

In another example, the log data 128 may include information indicative of user input events that occurred during the testing, such as a mouse click, a touch on a touchscreen, key input, verbal input, gesture, and so forth.

The analysis server 118 may obtain the session data 130. For example, the device data collection module 124, the proxy data collection module 126, and so forth may stream the session data 130 to the analysis server 118 during the test session. In another example, the analysis server 118 may poll the collection modules to obtain the log data 128.

Instead of, or in addition to, the session data 130, one or more deployed devices may provide deployed log data to the analysis server 118. The deployed devices may include, but are not limited to, smartphones, laptops, tablet computers, embedded devices, network-accessible devices, wearable computing devices, appliances, automobiles, aircraft, and so forth. The deployed device may execute the AUT 104 that incorporates the device data collection module 124, and so forth to provide log data 128 from the deployed device during operation. For example, the user of the deployed device may agree to allow for the collection of the log data 128 on the deployed device. While the user is using the AUT 104, log data 128 is collected. As a result, the log data 128 may include real-world information obtained from actual users using the AUT 104. Geolocation data may be obtained from a positioning device such as a global position system ("GPS") receiver, from a service such as Wi-Fi hotspot geolocation lookup, from a network provider based on signal strength or time delay at several network access points, and so forth.

The analysis server 118 includes an analysis module 132 that is configured to process at least a portion of the log data 128. The processing of the log data 128 may produce output data 134. The output data 134 may include one or more of burst data 136, issue data 138, and so forth. The burst data 136 comprises information that aggregates a plurality of activities that are deemed to be causally related to one another. The burst data 136 is described in more detail below beginning with FIG. 2. The log data 128 may also be processed to generate issue data 138. Issue data 138 comprises information about issues that are one or more particular activities that have been deemed to be of interest to the developer 102. For example, an issue may comprise a particular activity such as transfer of data that has been determined to have a metric value that exceeds a threshold. Continuing the example, the threshold value may specify a maximum amount of time for data transfer and the issue may comprise a data transfer activity that exceeded this maximum time. In some implementations, the issue data 138 may be generated based on the log data 128 associated with a particular grouping of burst data 136. For example, the session data 130 designated by the burst data 136 may be processed to generate the issue data 138. The issue data 138 is described in more detail below beginning with FIG. 2.

The analysis server 118, or another device in communication with the analysis server 118, includes a developer interface module 140. The developer interface module 140 provides interface functionality to the developer 102 or application used by the developer 102. The developer interface module 140 generates user interface data 142 that may be used to present the user interface 110 on the workstation 108. The user interface data 142 may comprise one or more of executable code, markup language, scripts, and so forth that are used to generate the user interface 110. For example, the developer interface module 140 may access the output data 134 and generate one or more webpages that may be presented within a web browser executing on the workstation 108 to present the user interface 110 to the developer 102.

In some situations, the analysis module 132 may not detect an issue that is of interest to the developer 102. The user interface 110 may include one or more issue request controls that, when activated by the developer 102, generate issue request data 144. The issue request data 144 may comprise information that is indicative of particular burst data 136 or other portions of the log data 128 that will be subjected to additional analysis. In some implementations, the issue request data 144 may include limited information, such as data indicative of a particular set of burst data 136. In other implementations, the issue request data 144 may include information obtained from the developer 102, and IDE, and so forth. For example, the issue request data 144 may include data from the developer 102 such as a comment that "the application is bouncing between several different servers for some reason". In another example, the issue request data 144 may include information indicative of the burst data 136 as well as a portion of the source code of the application as obtained from an IDE.

The issue request data 144 may be used to generate a request for further processing of the portion of the log data 128 that is indicated by the issue request data 144. The request may trigger the further processing by one or more of an automated system, one or more human support operators, and so forth. For example, the issue request data 144 may trigger workflow that involves scrutiny by one or more human support operators of at least the particular portion of the log data 128 specified by the issue request data 144. The one or more human support operators may generate new analysis rules or modify existing analysis rules in an attempt to generate issue data 138. In another example, the issue request data 144 may trigger workflow that involves additional processing by an automated system, such as using one or more machine learning techniques, artificial neural networks, machine classifier algorithms, statistical analysis, and so forth to determine if the log data 128 is indicative of one or more activities that may be of interest to the developer 102. In some implementations, output from the human support operators may be used to train or evaluate the automated system.

In some implementations, the user interface 110 may allow the developer 102 to select different proxy access devices to allow testing of the AUT 104 using different networks 112 at different geolocations, and so forth. This is discussed in more detail below with regard to FIG. 10. In other implementations, this functionality may be provided by an application programming interface (API) that the AUT 104 may use.

Figure 2:
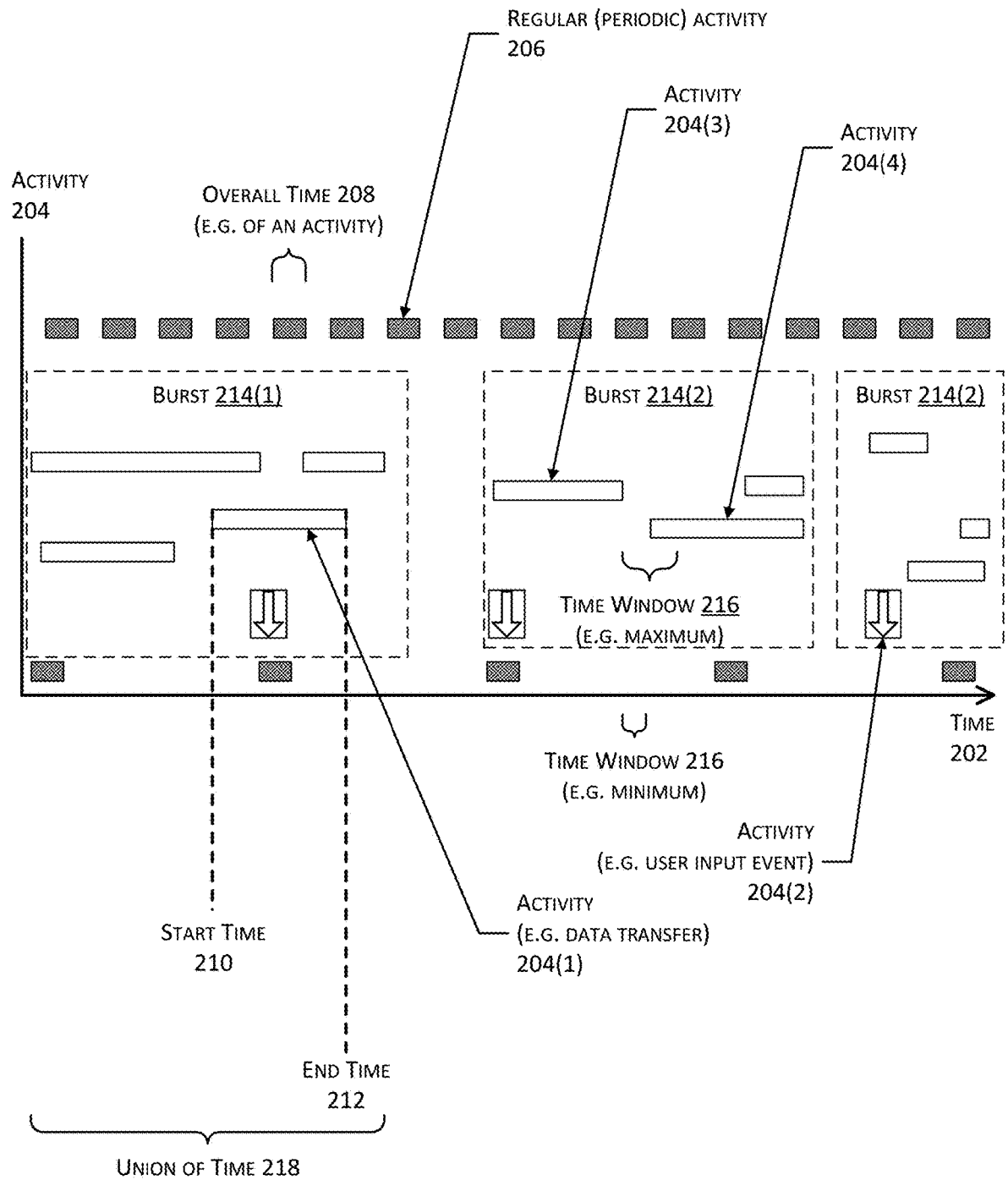
FIG. 2 illustrates the determination of bursts comprising activities deemed to be causally related that are undertaken by the application under test, according to one implementation.

FIG. 2 illustrates several examples 200 of the determination of bursts comprising activities deemed to be causally related that are undertaken by the AUT 104, according to one implementation. In this illustration, time 202 is indicated along the horizontal axis, increasing from left to right. Along a vertical axis one or more activities 204 are presented. Activities 204 associated with the same executing process, destination device 116, type of activity, and so forth may be presented in a common horizontal arrangement. For example, activities 204 depicted in the same row may involve data transfer with a particular uniform resource locator (URL) for a particular destination device 116.

As described above, activities 204 may include transactions or operations involving the transfer of data on the network 112, interactions with hardware or software associated with data transfer, and so forth. For example, the activities 204 may include the transfer of data across a WCDN, powering up a radio used to access the WCDN, power consumption, and so forth. The activities 204 may include operations that are occurring on the TD 106, or on another device such as a proxy, proxy access device, and so forth.

Some activity 204 may occur on a regular basis. For example, regular or periodic activity 206 such as heartbeat data, diagnostic data, keepalive packets, and so forth, may periodically be transmitted with a frequency of occurrence that is greater than a threshold value. In this illustration, regular activity 206 is depicted using shaded rectangles. For example, the threshold may specify that the frequency of occurrence must be at least once every 200 ms to be considered a nonrandom regular activity 206. In some implementations, information about the activity 204 may also be processed to determine if this is a regular activity 206. For example, if the activity 204 comprises a data transfer that is identical within a threshold amount to a previous data transfer to the same destination device 116, the activity 204 may be deemed to be a regular activity 206. In other implementations, a combination of both the frequency of occurrence, as well as one or more metrics associated with the data being transferred may be used to determine if an activity is regular or not. For example, diagnostic data may have a slight variation in the size of payload being transferred, and may be transferred on a schedule that is regular but does not exhibit the exact same times between subsequent transfers. This diagnostic data may be detected by looking at the similarity data transfer size, common destination device 116, and by looking at the timing of the transfers to determine that they are within a threshold value of corresponding to a periodic schedule.

Other activities 204 may occur at random or otherwise variable times, exhibiting a frequency of occurrence that is below a threshold value. For example, the activity 204(1) may comprise a request for data sent from the AUT 104 to the destination device 116. Also depicted is activity 204(2) comprising information indicative of user input event. For example, the device data collection module 124 may obtain log data 128 comprising the occurrence of user input events associated with the AUT 104 and timestamp data for these events. This information may be useful in some situations as a user input event may trigger data transfer on the network 112 by the AUT 104.

Each activity 204 exhibits an overall time 208 during which the activity is performed. For example, the overall time 208 may comprise a time extending from a start time 210 of the activity 204 to an end time 212 of the activity 204.

The analysis module 132 is configured to generate burst data 136. The burst data 136 is indicative of one or more bursts 214. A burst 214 comprises one or more activities 204 that are deemed to be causally associated with one another. In some situations, the analysis module 132 may not have access to the internal workings of the AUT 104. For example, the analysis module 132 may not receive data as to which lines of program code are being executed and how those relate to particular activities 204. In these situations, the analysis module 132 may generate the burst data 136 by performing one or more of the following analyses on the activities 204 included in the log data 128.

A burst 214 may exclude activity 204 that is deemed to occur in a nonrandom or periodic fashion. For example, the bursts 214 depicted here do not include the regular or periodic activity 206. In other implementations, the regular activity 206 may be included in one or more of the bursts 214.

A burst 214 may include one or more activities 204 that exhibit an overlap in their overall times 208. For example, burst 214(1) comprises four activities having overall times 208 that overlap one another at least partially. In some situations, the burst 214 may comprise a concatenation of overlapping overall times 208.

A burst 214 may include one or more activities 204 that do not overlap one another in terms of their overall times 208, but instead occur within a designated time window 216 of one another. For example, as shown here activity 204(4) exhibits a start time 210 that is within a time window 216 of the end time 212 of the activity 204(3).

The time window 216 may be specified that indicates a particular interval of time. In one implementation, a burst 214 may be designated as including those different activities 204 that have a start time 210 or an end time 212 that are within the time window 216 of other activities 204. As a result, activities 204(3) and 204(4) may be deemed to be members of the same burst 214(2). In some implementations, the time window 216 may apply to activities 204 of a single type, such as communication transactions communicating with a particular destination device 116. In other implementations, the time window 216 may span activities 204 of different types, such as a transmission of data to a first destination device 116(1) and receipt of data from a second destination device 116(2).

In some implementations, the union of time 218 may be determined for one or more of the activities 204 within a burst 214. The union of time 218 may comprise an interval of time that extends from a first start time 210 of an activity 204 within a burst 214 until a last end time 212 of the activity 204 within the burst 214. The union of time 218 may comprise a function such as that used in mathematical set theory.

The time window 216 may include minima and maxima. For example, the time window 216 may be determined at least in part based on a round-trip time between the AUT 104 and a proxy, proxy access device, and so forth. For example, the time window 216 may include a minima of 75 ms that corresponds to a minimum round-trip time and a maxima of 150 ms that corresponds to a maximum round-trip time. By utilizing such minima and maxima, the burst 214 may be set to exclude activities 204 that could not be causally related to one another because there is insufficient time for data to have been sent to the destination device 116 and then received back. Continuing the example, two activities 204 that occur within 10 ms of one another may not be causally related because that would be insufficient time in the example above for a cause such as a request to be sent to the destination device 116 and generate a response which is then returned to the TD 106.

In some implementations, the time window 216 may vary dynamically based on changing conditions. For example, the network 112 between the TD 106 and a proxy access device may be periodically tested to determine minima and maxima round-trip times. These minima and maxima may then be used to generate values for a minimum time window 216 and a maximum time window 216.

Other information may also be used to associate activities 204. For example, in some implementations the packets in AUT traffic 114 may be inspected to determine if two activities 204 are associated with one another, such as being part of a hypertext transfer protocol (HTTP) request and response. In some situations, a plurality of particular activities 204 such as particular packets transferred may be associated into message groups. For example, a message group may comprise a connect message, a data request, and a response. The elements of the message group may be included in a single burst 214. In other implementations, different bursts 214 may include different elements of the single message group, but the association provided by the message group may be maintained to facilitate further analysis.

During operation of the system, the analysis module 132 may determine a burst 214 using one or more of the criteria described above. For example, a burst 214 may include activities 204 that have overlapping overall times 208, that are within the time window 216 of one another, and so forth.

Figure 3:
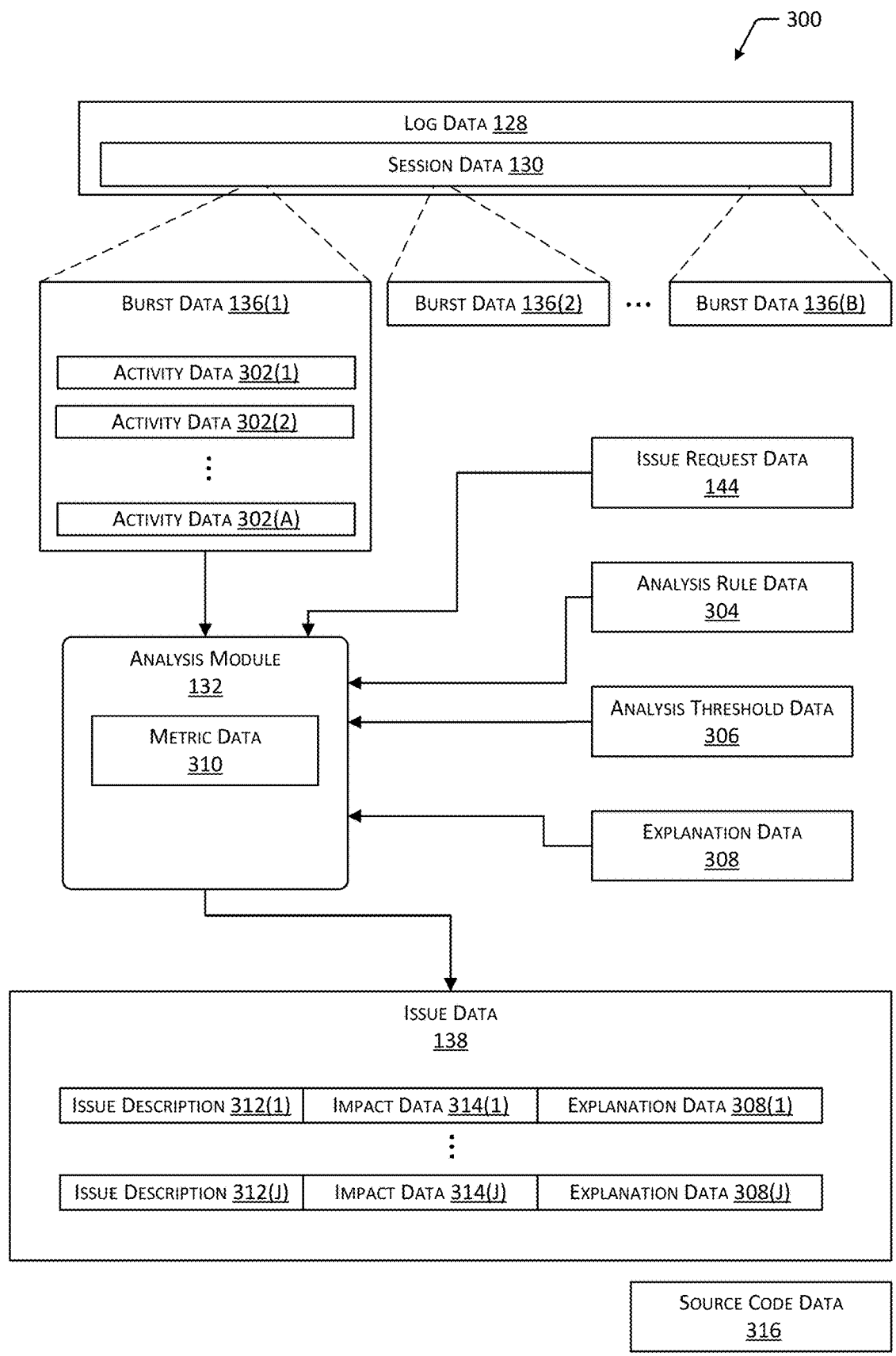
FIG. 3 illustrates a flow diagram of processing of burst data to generate issue data, according to one implementation.

FIG. 3 illustrates a flow diagram 300 of processing of burst data 136 to generate issue data 138, according to one implementation. As described above, log data 128 may include session data 130, such as activities 204 involving transfer of data between the AUT 104 and one or more destination devices 116. While the following examples are described with respect to session data 130, it is understood that the following analysis may also be applied to other information contained in the log data 128 instead of or in addition to the session data 130.

As described above with regard to FIG. 2, the burst data 136 comprises information about one or more activities 204 that are deemed to be causally related. In this illustration, information about the activities 204 is depicted as activity data 302. Burst data 136 may comprise a set of activity data 302. For example, the activity data 302 may comprise information such as a start time 210 and an end time 212 of an activity 204, destination device 116 associated with the activity 204, quantity of data transferred, and so forth.

The analysis module 132 may utilize as input the burst data 136 and one or more of the issue request data 144, analysis rule data 304, analysis threshold data 306, or explanation data 308. The analysis module 132 may receive as input, or generate from the activity data 302 or other information, metric data 310. For example, the metric data 310 may comprise a measurement of the overall time 208 of an activity 204, union of times 218 of activities 204, quantity of data transferred for an activity 204, and so forth.

The analysis rule data 304 may comprise one or more rules that are indicative of previously determined situations in which metric data 310 or other information obtained from activity data 302 exceeds one or more threshold values specified by the analysis threshold data 306. For example, an analysis rule may comprise an expression that compares the metric data 310 to the threshold value. In one implementation, the analysis rules may be expressed using the Python programming language, or another programming or markup language.

The analysis threshold data 306 may be specified by one or more of the developer 102, administrators of the analysis server 118, automated processes, and so forth. For example, an automated process may generate a statistical analysis of previously acquired log data 128 to determine an average time for transfer of image data. This average time value may be used as an initial threshold value stored in the analysis threshold data 306 for the comparison of activities 204 that involve the transfer of image data.

In some implementations, the threshold values used to generate the issue data 138 may be based at least in part on input from the developer 102. For example, using the user interface 110, the developer 102 may change one or more of the threshold values specified by the analysis threshold data 306.

The explanation data 308 comprises more detailed information about the issue. The explanation data 308 may comprise rich text, hyperlinks, and so forth providing more comprehensive explanations, code examples, and so forth. For example, the explanation data 308 may comprise text that describes the recommended threshold maximum time for image load, why downsampling is advantageous, and may also contain links to examples on how to downsample. In implementations where the issue involves a variance relative to a threshold value, the explanation data 308 may comprise information indicative of how to reduce the variance.

Operation of the analysis module 132 may be responsive to the issue request data 144. For example, the issue request data 144 may trigger the analysis module 132 to perform more detailed analysis on the burst data 136. This more detailed analysis may include processing by another automated system, may involve requesting input from human operators, or a combination thereof.

In some implementations, the analysis module 132 may perform a deep inspection of the AUT traffic 114. For example, the analysis module 132 may determine that an image file is being transferred using a first image format and first data compression level. Continuing the example, the analysis module 132 may test the image file or otherwise analyze the image file to determine if a second image file format or second data compression level would result in improved performance, reducing a data transfer time.

The issue data 138 generated by the analysis module 132 may include one or more of an issue description 312, impact data 314, explanation data 308, and so forth. The issue description 312 may comprise information that is indicative of the nature of the issue. For example, the issue description 312 may comprise the text "Excessive Image Load Time". Associated with the issue description 312 may be impact data 314. The impact data 314 comprises information indicative of the effect of the issue on performance. For example, the impact data 314 may include information indicative of an amount of delay by one or more activities 204 that is deemed to be in excess of a threshold value. Continuing the example above, the impact data 314 may indicate that the image load time exceeded a threshold value by 2.23 seconds. The issue data 138 may also include explanation data 308 as described above that is associated with the issue. The impact data 314 may thus provide information about some aspect of the AUT 104 that has performed at a level that has been deemed to be indicative of a problem or at least a non-optimized condition, while the explanation data 308 provides additional detail to guide the developer 102 towards a resolution of that aspect. In some implementations, the system may interface with or incorporate elements of an integrated development environment ("IDE") used for development or maintenance of the AUT 104. In these implementations, the issue data 138 may be associated with the particular portion of source code data 316. The source code data 316 may comprise at least a portion of source code, markup language, script, or other instructions that are used to process data when executed by a processor. In some implementations, the source code data 316 may need to be compiled prior to execution by the processor.

Figure 4:
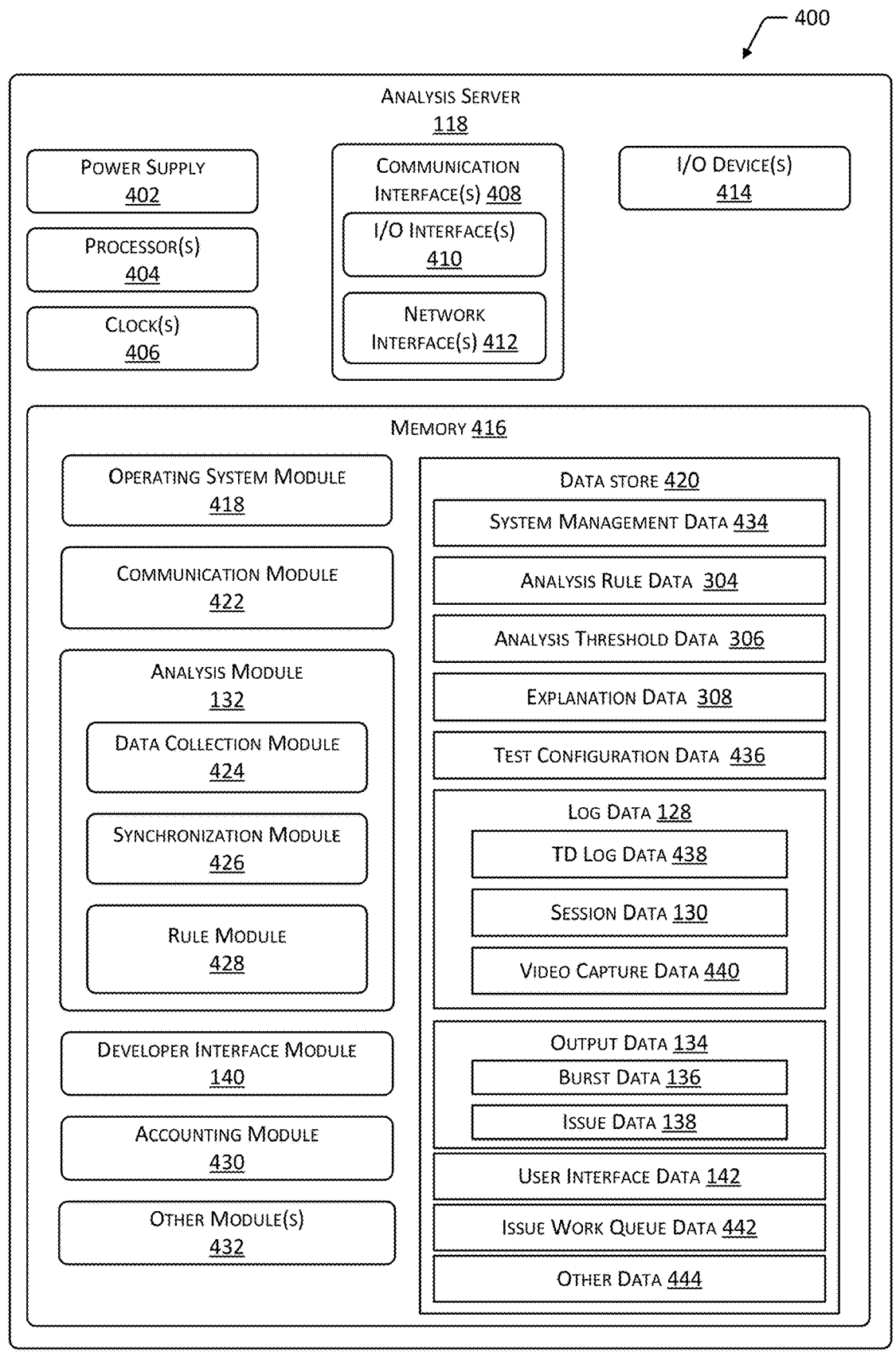
FIG. 4 illustrates a block diagram of an analysis server configured to provide a user interface with information based on the burst data and the issue data, according to one implementation.

FIG. 4 illustrates a block diagram 400 of the analysis server 118 configured to provide the user interface 110 with information based on the burst data 136, the issue data 138, and so forth, according to one implementation.

One or more power supplies 402 may be configured to provide electrical power suitable for operating the components of the computing device. In some implementations, the power supply 402 may include a rechargeable battery, fuel cell, photovoltaic cell, power conditioning circuitry, and so forth.

The analysis server 118 may include one or more hardware processor(s) 404 (processors) configured to execute one or more stored instructions. The processor(s) 404 may include one or more cores. One or more clocks 406 may provide information indicative of date, time, ticks, and so forth. For example, the processor(s) 404 may use data from the clock 406 to generate a timestamp, trigger a preprogrammed action, and so forth.

The analysis server 118 may include one or more communication interfaces 408, such as input/output (I/O) interfaces 410, network interfaces 412, and so forth. The communication interfaces 408 may enable the analysis server 118, or components of the analysis server 118, to communicate with other devices or other components of the analysis server 118. The I/O interfaces 410 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include any manner of input device or output device associated with the analysis server 118. For example, I/O devices 414 may include touch sensors, keyboards, mouse devices, microphones, image sensors (e.g., cameras), scanners, displays, speakers, haptic devices, printers, positioning devices, and so forth. A positioning device may comprise one or more of a satellite radionavigation system, inertial navigation system, terrestrial radionavigation system, or other device configured to generate data indicative of the geolocation. For example, the satellite radionavigation system may comprise a Global Positioning System ("GPS") receiver, the terrestrial radio-navigation system may utilize information from network access points, and so forth. In some implementations, the I/O devices 414 may be physically incorporated with the analysis server 118 or may be externally placed.

The network interfaces 412 may be configured to provide communications between the analysis server 118 and other devices, such as the I/O devices 414, routers, access points, and so forth. The network interfaces 412 may include devices configured to couple to one or more networks 112 including local area networks (LANs), WLANs, wide area networks (WANs), WWANs, and so forth. For example, the network interfaces 412 may include devices compatible with Ethernet, Wi-Fi, Bluetooth, ZigBee, Z-Wave, 3G, 4G, LTE, and so forth.

The analysis server 118 may include one or more buses or other internal communications hardware or software that allows for the transfer of data between the various modules and components of the analysis server 118.

As shown in FIG. 4, the analysis server 118 may include one or more memories 416. The memory 416 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 416 may provide storage of computer-readable instructions, data structures, program modules, and other data for the operation of the computing device. A few example modules are shown stored in the memory 416, although the same functionality may alternatively be implemented in hardware, firmware, or as a system on a chip (SoC).

The memory 416 may include one or more operating system (OS) modules 418. The OS module 418 may be configured to manage hardware resource devices such as the I/O interfaces 410, the network interfaces 412, the I/O devices 414, and to provide various services to applications or modules executing on the processors 404. The OS module 418 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; the Mac OS or iOS promulgated by Apple Inc. of Cupertino, Calif., USA; or other operating systems.

A data store 420 and one or more of the following modules may also be stored in the memory 416. The modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including other computing devices, network attached storage devices, and so forth.

A communication module 422 may be configured to establish communications with one or more other devices using one or more of the communication interfaces 408. Communications may be authenticated, encrypted, and so forth. For example, the communication module 422 may utilize digital certificates to authenticate the identity of devices involved in the communication. The communication module 422 may be configured to establish a virtual private network (VPN) connection or tunnel with the proxy host device.

The analysis module 132 may also be stored in the memory 416 and may perform one or more of the functions as described above. The analysis module 132 may include or may be in communication with one or more of a data collection module 424, synchronization module 426, or rule module 428. The data collection module 424 may be configured to obtain the log data 128 or portions thereof for one or more of the device data collection module 124, the proxy data collection module 126, or other devices or modules within the system 100. The synchronization module 426 may be configured to coordinate or synchronize the log data 128 into a common reference frame, such as by time. For example, the synchronization module 426 may acquire the session data 130 that includes timestamps for transfers of data, and may synchronize the session data 130 with the video capture data. The synchronization module 426 may be configured to determine a common reference time between the different forms and sources of log data 128 to allow for the association of a particular activity 204 or portion thereof with a particular portion of the video capture data, or other information that is been obtained.

The rule module 428 may be configured to generate rules for inclusion in the analysis rule data 304. For example, the rule module 428 may utilize one or more automated techniques to generate an analysis rule. In another example, the rule module 428 may receive new rules, or modifications to existing rules from one or more human operators. The rule module 428 may also be configured to process log data 128 or a portion thereof using the analysis rule data 304, the analysis threshold data 306, and so forth as described above with regard to FIG. 3. For example, the rule module 428 may be used to generate the issue data 138.

The analysis module 132 may perform other functions as well. For example, the analysis module 132 may be configured to generate information indicative of one or more network characteristics. Network characteristics may include information associated with the transfer of data using the network 112. The network characteristics may include, but are not limited to, bandwidth, latency, number of packets sent, packet loss, transmit power, received signal strength, jitter, and so forth. The network characteristics for a particular connection between a network access point and a communication interface of a computing device may be available locally, but may be difficult or impossible to provide to a developer 102 or other entity associated with maintaining the application or the computing device.

The memory 416 may also include the developer interface module 140 described above. In some implementations, at least a portion of the functionality of the developer interface module 140 may be performed by another computing device, such as a Web server.

The accounting module 430 may be configured to determine and assess charges associated with the use of the system 100, provide remuneration to operators of the proxy access devices, assess charges for the development of rules, assess charges for consulting on the operation of the AUT 104, and so forth. For example, the accounting module 430 may be configured to assess charges to an account associated with the developer 102 when one or more human operators are involved to help determine new rules to detect one or more issues. The accounting module 430 may also provide other functions, such as assessing charges associated with the use of a particular proxy access device at a particular geolocation for a certain amount of time, quantity of data transferred, and so forth.

Other modules 432 may also be present in the memory 416. In some implementations, one or more of the modules may be stored at least in part in the memory 416 of other devices, may be executed at least in part on the other devices, and so forth. For example, a network analysis module may be configured to generate data indicative of one or more network characteristics associated with the AUT traffic 114. In another example, a coordination module may be configured to access system management data 434 to direct operation of the system.

The system management data 434 may include status data, such as proxy host device (PHD) status data, proxy access device (PAD) status data, and so forth. A PHD may comprise a workstation or server that coordinates the operation of one or more PADs. The PADs may comprise cellular telephones or other devices that include the ability to connect to the WCDN, WLAN, or other network 112 that is of interest for testing. The PHD status data may comprise information such as a network address, operational status, information indicative of installed software, version of installed software, current utilization, and so forth. The PAD status data may comprise information such as make and model of the PAD, OS version of the PAD, connection status to the second network 112(2), whether the PAD is currently in use by another AUT 104, and so forth.

The system management data 434 may also include developer account data. The developer account data may include information such as individual account logins and passwords, billing information, usage information, and so forth.

The other computing devices described in this disclosure may have one or more similarities with respect to the hardware and software described above. For example, the workstation 108 includes one or more processors 404, included operating system module 418, and so forth.

The system management data 434 may also include device configuration data. The device configuration data may comprise instructions, applications, modules, and so forth, that may be used to configure one or more of the PHD or the PAD. For example, the device configuration data may include one or more scripts that may be executed by the PHD to send instructions to PAD. These instructions may configure the PAD to transfer data between the PHD and the second network 112(2).

The data store 420 may also store test configuration data 436 associated with the testing. For example, the test configuration data 436 may specify a second geolocation selected by the developer 102 that will be used for network testing, network address of the PHD, credentials to access the PHD, costs associated with access to the PAD, information from the analysis server 118 about the PHD, PAD, and so forth. In some implementations, at least a portion of AUT traffic 114 may be stored in the data store 420.

In some implementations, the analysis server 118 may generate at least a portion of the test configuration data 436. The generation of the test configuration data 436 may be based at least in part on information provided by the developer 102. For example, the developer 102 may use the developer interface module 140 to specify parameters such as different types of tests parameters, alarm limits, test thresholds, modify one or more values of the analysis threshold data 306, and so forth. Based on these parameters, the test configuration data 436 may be generated. In some implementations, test configuration data 436 may be modified by the developer 102, or may be generated entirely by the developer 102 or another device or entity.

The log data 128 may include test device (TD) log data 438. For example, the TD log data 438 may comprise information indicative of state of the radio, memory usage, processor usage, temperature, power consumption, and so forth of the test device 106 during testing.

The log data 128 may also include the session data 130 described above.

In some implementations, the log data 128 may include video capture data 440. As described above, the video capture data 440 may comprise one or more images of a display device, or intended for presentation on the display device, that is associated with testing. For example, the video capture data 440 may comprise a motion picture experts group (MPEG 4) video file of images generated by a graphic system of the test device 106.

The data store 420 may store one or more of the analysis rule data 304, the analysis threshold data 306, the explanation data 308, log data 128, the output data 134, the user interface data 142, and so forth.

Also stored in the data store 420 may be issue work queue data 442. The issue work queue data 442 may comprise information generated responsive to the issue request data 144. For example, the issue work queue data 442 may include one or more requests expressed as issue request data 144 for more detailed analysis of a particular burst 214 or other portion of the log data 128.

Other data 444 within the data store 420 may include information such as layout templates to generate the user interface data 142, individual developer 102 preferences, and so forth.

In some implementations, one or more of the modules may be stored at least in part in the memory of other devices, may be executed at least in part on the other devices, and so forth. For example, one or more functions associated with the accounting module 430 may execute on another server.

Figure 5:
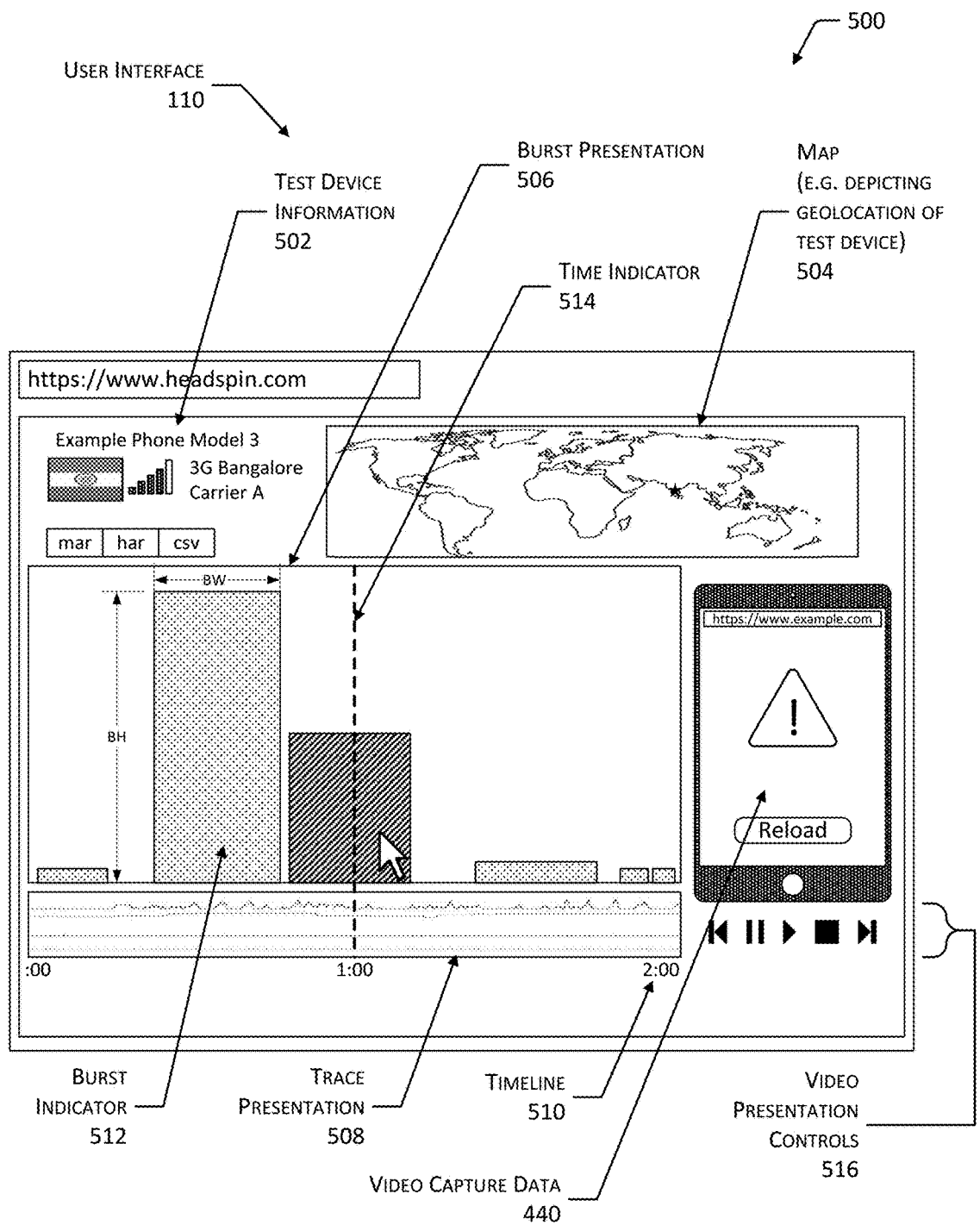
FIG. 5 illustrates a user interface depicting information based on the burst data, according to one implementation.

FIG. 5 illustrates an example 500 of a user interface 110 depicting information based on the burst data 136, according to one implementation.

In this and the following examples of the user interface 110, the user interface 110 is depicted as being presented within a web browser or using a web rendering engine. In other implementations, the user interface 110 may be presented using a dedicated application, non-web browser, and so forth.

Test device information 502 is depicted. For example, test device information 502 may provide information indicative of the type of test device 106 that is involved in the testing, an indication of the geolocation and network 112 that is being used to provide access to the WCDN during testing, and so forth.

A map 504 is also depicted. The map 504 may provide an image of a map indicating the geolocation of either the test device 106 or a proxy access device being used by the test device 106 to access the WCDN.

One or more of a burst presentation 506, a trace presentation 508, or a timeline 510 may be included in the user interface 110. The burst presentation 506 provides information based at least in part on the burst data 136 or the issue data 138 associated with that burst data 136. For example, a burst indicator 512 may comprise a rectangle with a width "BW" along a horizontal axis that is based on a union of times 218 of the activities 204 in the burst 214 while the height "BH" along a vertical axis is a sum of the data transferred by the activities 204 of the burst 214. In another implementation, the BW may be described as the elapsed time during which the particular burst 214 took place, such as depicted in the video capture data 440, while the BH may be indicative of a union of the impact times in the burst 214. In one implementation, the impact time comprises the time which the various elements of the burst 214 exceeded a threshold value. For example, the height may be indicative of how much time was consumed over and above the respective threshold values. By looking at the burst indicator 512, the developer 102 is quickly able to determine which of the bursts 214 involve the most amount of time, large amount of data transfer, and so forth. In other implementations, the burst indicator 512 may use other information to determine the dimensions thereof. For example, the height along a vertical axis may be based at least in part on the values of one or more network characteristics associated with one or more activities 204.

The trace presentation 508 may comprise one or more graphs that depict changes in designated characteristics over time. For example, the trace presentation 508 may comprise information indicative of utilization of the processor of the TD 106, usage of memory of the TD 106, the quantity of outbound application traffic 120, quantity of inbound application traffic 122, number of concurrent connections, and so forth.

The user interface 110 may also include presentation of the video capture data 440. As described above, the video capture data 440 may comprise a recording of images that were displayed or intended for display on the TD 106 during testing of the AUT 104.

The timeline 510 provides information indicative of a point in time in which the user interface 110 is displaying particular information. For example, the timeline 510 here shows a beginning time of 0 seconds and an ending time of 2:00, that encompasses the duration of the time during which testing of the AUT 104 was taking place.

Presentation of the data within the user interface 110 may be synchronized. A time indicator 514 is used to provide visual indicia along the timeline 510 as to the current point in time that is being presented in the user interface 110. For example, as illustrated here the time indicator 514 comprises a dashed vertical line that is centered at 1:00. Continuing this example, the image presented by the video capture data 440 comprises the image on the display of the TD 106 at that time.

The user interface 110 may include one or more video presentation controls 516. The video presentation controls 516 may allow the developer 102 to adjust presentation of video capture data 440 such as rewinding, pausing, playing, stopping playback, fast forwarding, and so forth.

The developer 102 may use other inputs to shift the moment of time for which information is presented within the user interface 110. For example, the developer 102 may use a mouse or a touch control to drag the time indicator 514 to a desired point along the timeline 510. Once released from the drag, playback of the video capture data 440 and the corresponding other information within the user interface 110 may resume from that point. Gesture input such as pinching to zoom out or moving two fingers to zoom in on a portion of the timeline 510 may also be used.

In other implementations, one or more of the different user interface elements depicted may be presented or omitted. For example, the map 504 may be omitted.

Figure 6:
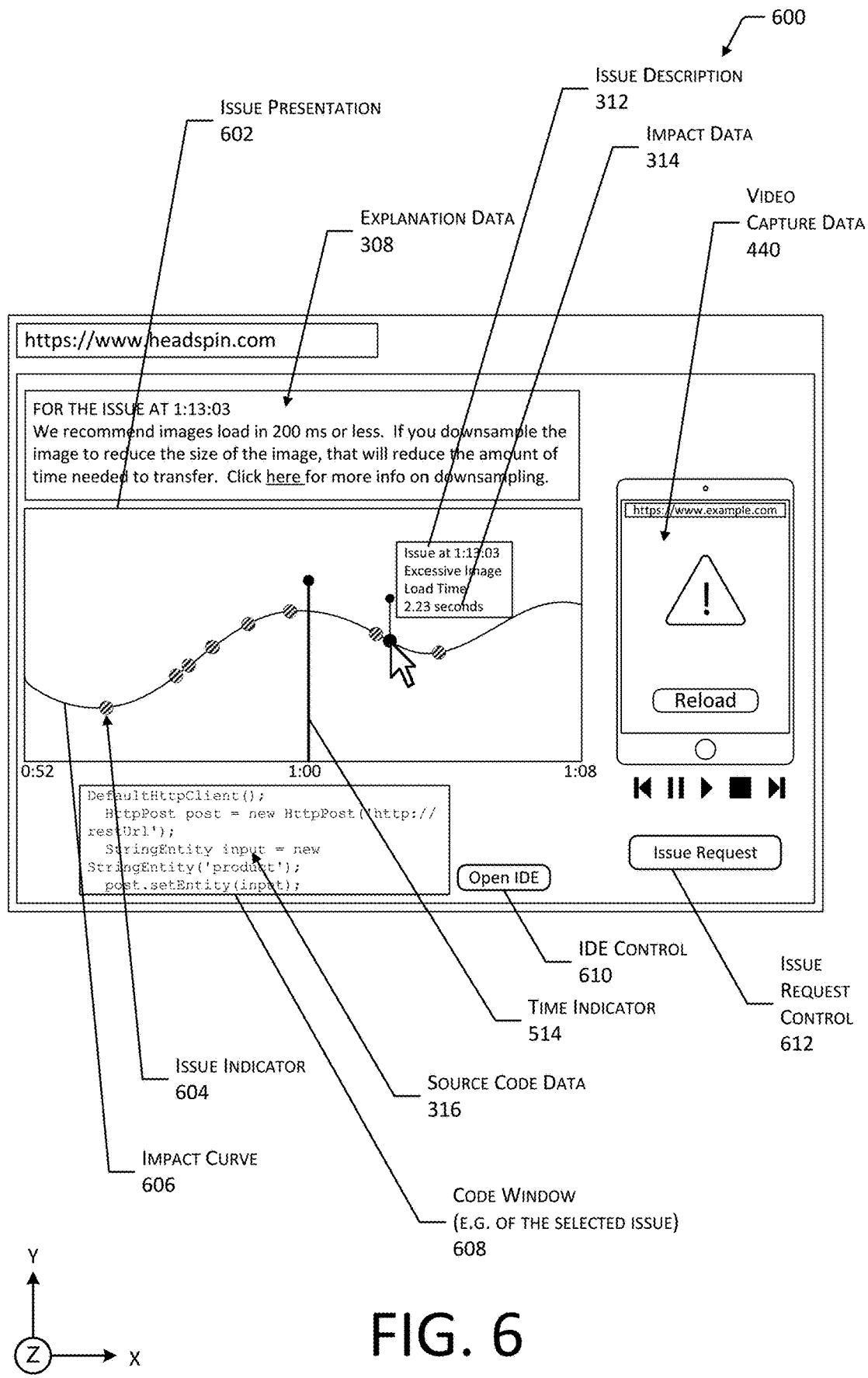
FIG. 6 illustrates a user interface depicting information based on the issue data associated with a burst, according to one implementation.

FIG. 6 illustrates another example 600 of a user interface 110 depicting information based on the issue data 138 associated with a burst 214, according to one implementation. Referring to FIG. 5, the user may select a particular burst indicator 512 (indicated by the cursor arrow of FIG. 5) to see additional information based on the burst data 136 associated with that burst indicator 512. Responsive to that user input, the example 600 of the user interface 110 provides additional information associated with that burst 214. In this illustration, the timeline 510 now presented illustrates the time from 0:52 to 1:08, showing a view that is "zoomed in" on the time associated with the particular burst 214.

An issue presentation 602 section provides information about one or more of the issues within the burst 214 associated with the burst indicator 512 that was selected. One or more issue indicators 604 provide visual indicia indicative of an occurrence of an issue at a particular time on the timeline 510. The placement along the horizontal axis of the issue indicator 604 may be based on the time at which the issue was determined to occur. For example, the issue indicator 604 for may be placed using information such as a timestamp present in the issue data 138 associated with a particular issue. The placement of the issue indicator 604 with respect to the vertical axis may be based on one or more of the metric data 310 or other attributes associated with the issue. For example, the vertical axis in this illustration may indicate a quantity of data transferred between the AUT 104 and the destination device 116.

A time indicator 514 may also be presented, similar to that described above. The user interface 110 may also present the video capture data 440 as described above. The position of the time indicator 514 relative to the timeline 510 may synchronized with the presentation of the video capture data 440, similar to that described above.

In some implementations, an impact curve 606 may be generated. The impact curve 606 may comprise a curve that has been fitted to the issue indicators 604. Presentation of the impact curve 606 may serve to improve comprehension by the developer 102 of the changes in the performance of the AUT 104 over time during the operation of the test.

The developer 102 may provide a user input, such as indicated here with the cursor arrow, such as mousing over or otherwise selecting a particular issue indicator 604. This user input may result in additional information being presented. For example, as depicted here the issue description 312 and impact data 314 associated with the issue is presented.

The explanation data 308 associated with the issue that has been selected may also be presented as depicted here.

In some implementations, a code window 608 may present at least a portion of the program code associated with the selected issue. For example, as depicted here source code data 316 associated with of the image transfer is depicted. A portion of the source code data 316 may thus be presented contemporaneously with the issue data 138. In some implementations, where the system is integrated with an IDE, the developer 102 may edit code within the code window 608 to attempt to mitigate the particular issue. An IDE control 610 may be presented in some implementations that allows for an IDE to be opened and presented to the developer 102. For example, activation of the IDE control 610 may open an IDE application. In some situations, the particular source code data 316 that is associated with the issue may be presented within the IDE.

As described above, in some situations, the developer 102 may determine that operation of the AUT 104 during the testing did not meet their expectations, criteria, or test parameters. In some situations, the analysis rule data 304 may not include a rule that generates issue data 138 associated with the issue detected by the developer 102. In this situation, the developer 102 may activate an issue request control 612 in the user interface 110. The issue request control 612 may be configured to generate the issue request data 144 described above. Once generated, the issue request data 144 may be processed to initiate a workflow comprising further analysis of the burst data 136 or other information in the log data 128.

In some implementations, responsive to activation of the issue request control 612, the user interface 110 may present a waterfall display. The waterfall display may present the session data 130 or other information associated with the point in time associated with the issue request data 144.

Other controls may be presented in the user interface 110. For example, the developer 102 may be able to change the information that is used for the vertical axis of the issue presentation 602.

Figure 7:
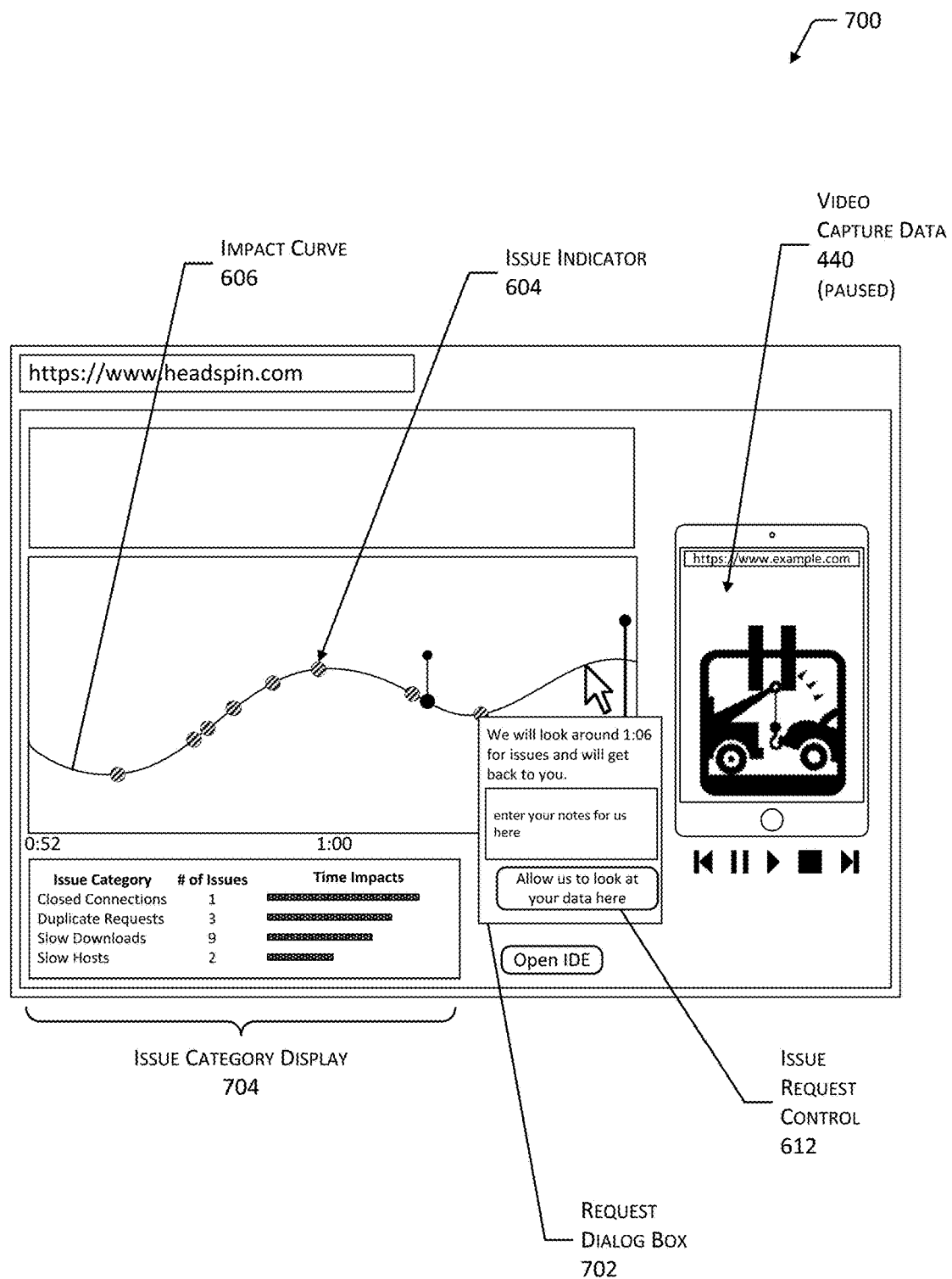
FIG. 7 illustrates the user interface of FIG. 6 for entry of an issue, according to one implementation.

FIG. 7 illustrates at 700 an example of a user interface 110 after user selection of a point on the impact curve 606 that is not associated with an issue indicator 604. The developer 102 may select a particular point on the impact curve 606 where no issue indicator 604 is defined. For example, the particular portion of the impact curve 606 may be of interest to the developer 102 for other reasons, such as the video presented in the video capture data 440. The selection may be responsive to a user input, such as a mouse click, touch input, and so forth. Responsive to this user input, issue request data 144 may be generated.

In some implementations, responsive to the user input, playback of the video capture data 440 may be paused. A request dialog box 702 or other user interface to obtain input may be presented to allow for the acquisition of information from the developer 102. Upon activating the issue request control 612, the user input may be included in the issue request data 144. The issue request data 144 may initiate a workflow that presents the information associated with the particular point in time to engineers or an automated system for further analysis. The engineers or automated system may then provide a more detailed assessment of that portion of the output data 134 that is associated with the particular point. This information may then be presented in a user interface to the developer 102.

Also presented is an issue category display 704. The issue category display 704 presents issue indicators that are associated with a particular category of issue. A number of instances of that category of issue may be presented. The issue category display 704 may also include information indicative of a time impact for that category of issue. For example, the time impact may comprise a bar graph that is indicative of a union of the total time in which actual performance exceeded a threshold value.

In some implementations, the developer 102 may generate a user input event, such as a touch or mouse click at a particular issue indicator 604 on the impact curve 606 or a particular issue category, to select a particular issue. Responsive to this user input event, a waterfall display may be presented that provides additional information about that issue. The impact of the selected issue may be presented as described below with regard to the contribution area 802 (described below) on the impact curve 606, by changing the color of the elements associated with the issue in the waterfall display, and so forth.

Figure 8:
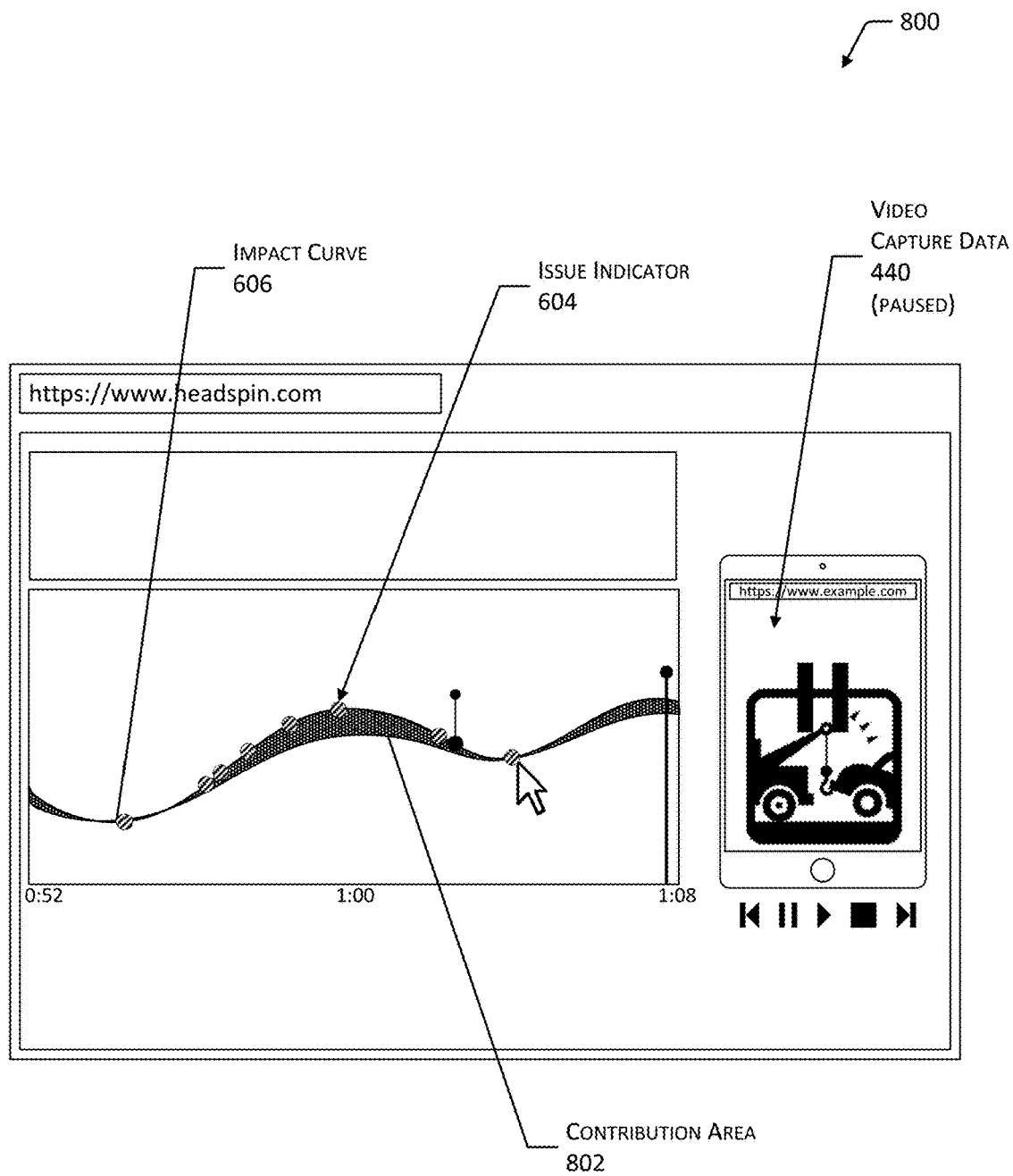
FIG. 8 illustrates additional information presented in the impact curve, according to one implementation.

FIG. 8 illustrates another example 800 of a user interface 110 depicting information based on the issue data 138, according to one implementation. In this user interface 110, the impact curve 606 is presented, such as described above with regard to FIG. 6. A contribution area 802 is also depicted. The contribution area 802 provides information associated with a particular occurrence of an issue or category of issue and the impact of that particular issue or category of issue. The contribution area 802 may be represented as an area that extends below the impact curve 606. For example, the shaded area depicted here may indicate the amount of time that one or more instances of the particular category of issue exceeded a threshold value. Continuing the example depicted here, the category of issue may comprise a "slow download" issue and thus three instances of slow downloads are presented in this area. In another implementation, the contribution area 802 may be shown for a single instance of an issue that occurs at different times. For example, the shaded area depicted here may be associated with a single instance such as a slow download that exceeds the threshold value at three different times.

Figure 9:
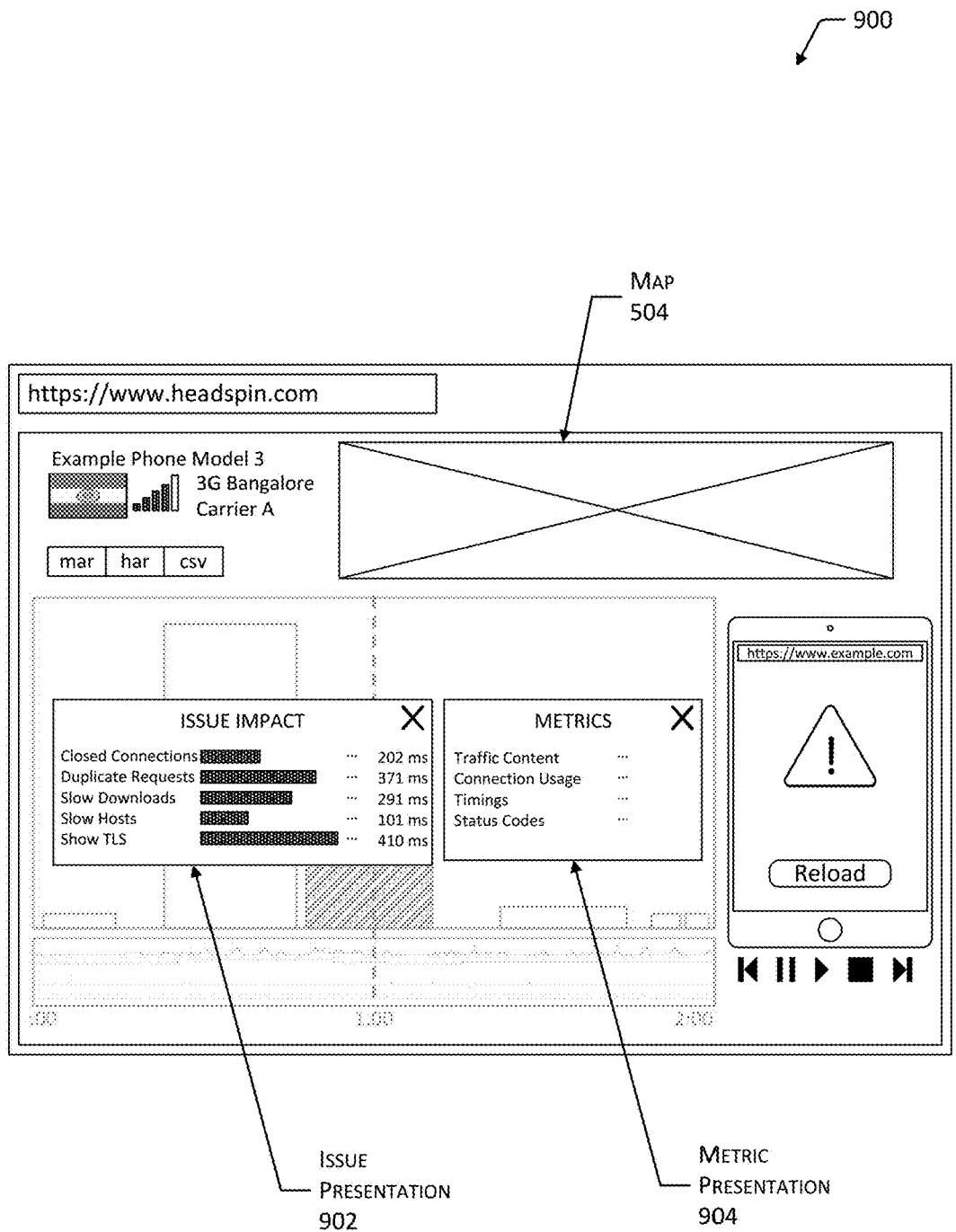
FIG. 9 illustrates another user interface depicting information based on the issue data, according to one implementation.

FIG. 9 illustrates another example 900 of a user interface 110 depicting information based on the issue data 138, according to one implementation. In this alternative user interface 110, selection of a particular burst indicator 512 may present the example user interface 110 depicted here.

An issue presentation 902 section provides information such as a list of the issues in the issue data 138 associated with the burst data 136. The user interface 110 may also present a metric presentation 904 section. The metric presentation 904 may include information about various network characteristics or other information obtained from the log data 128. The developer 102 may select a particular metric to view additional detail associated with that metric.

Figure 10:
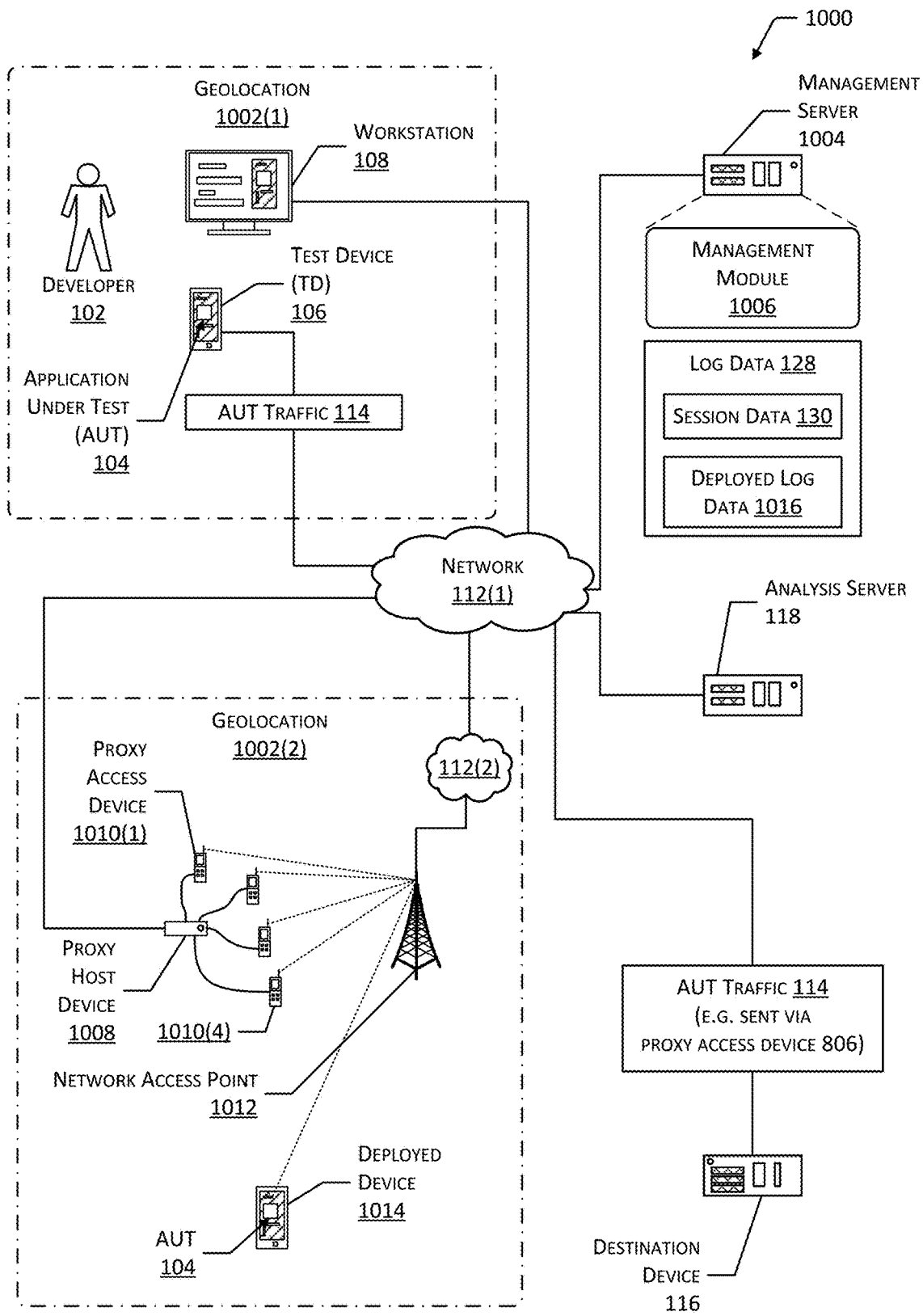
FIG. 10 illustrates the system configured to use proxy access devices and proxy host devices to allow for testing of the AUT 104 on networks 112 located at different geolocations, according to one implementation.

FIG. 10 illustrates the system configured to use proxy access devices 1010 and proxy host devices 1008 to allow for testing of the AUT 104 on networks 112 located at different geolocations 1002, according to one implementation.

One or more of the developer 102, the TD 106, or the workstation 108 may be located at a first geolocation 1002(1). The geolocation 1002 comprises a geographic location, such as a particular room, building, city, state, country, and so forth. For example, the geolocation 1002 may be specified by a set of coordinates with regard to latitude and longitude on the surface of the Earth.

One or more of the TD 106 or the workstation 108 may be connected to a first network 112(1). The first network 112(1) may, in turn, be connected to or be part of a larger network. For example, the first network 112(1) may comprise the Internet. The connection used by the TD 106 or the workstation 108 may include, but is not limited to, a wired Ethernet connection, a wireless local area network (WLAN) connection such as Wi-Fi, and so forth. For example, the first geolocation 1002(1) may comprise an office where the developer 102 is working. The TD 106 may connect to a local Wi-Fi access point that is connected via Ethernet cable to a router. The router, in turn, is connected to a cable modem that provides connectivity to the Internet.

A single destination device 116 is depicted for ease of illustration and not necessarily as a limitation. For example, the AUT 104 may exchange AUT traffic 114 with many different destination devices 116 during operation.

The AUT 104 may generate AUT traffic 114 that is exchanged with the destination device 116 during operation. Traditionally, the AUT traffic 114 generated by the TD 106 at the first geolocation 1002(1) would be sent to the first network 112(1) and on to the destination device 116. However, this traditional situation limits the ability to generate test data to the first geolocation 1002(1).

To provide the functionality described herein, the developer 102 may incorporate a software development kit (SDK)

into the AUT 104. In other implementations, techniques other than an SDK may be used to provide the functionality described herein.

The SDK is configured to provide a user interface 110 to the developer 102 that allows for the redirection of the AUT traffic 114. The SDK may comprise instructions to establish communication with the management server 1004. For example, the SDK may add a user interface 110 that allows the developer 102 to interact with the management module 1006.

The management server 1004 utilizes the management module 1006 to coordinate the activities of one or more of proxy host devices 1008 or proxy access devices 1010. The proxy host device 1008 connects to the first network 112(1) and also to one or more of the proxy access devices 1010. For example, the proxy host device 1008 may comprise a desktop computer to which four proxy access devices 1010 are tethered. In some implementations, the proxy host device 1008 may comprise a tablet computer, server, etc. Any number of proxy access devices 1010 may be tethered to the proxy host device 1008.

The proxy access devices 1010, in turn, are able to connect to a network access point 1012. The network access point 1012 provides connectivity to a second network 112(2). For example, the proxy access devices 1010 may comprise commodity cellphones, the network access points 1012 may comprise cell phone towers, and the second network 112(2) may comprise a WWAN, such as a wireless cellular data network (WCDN). The second network 112(2) may in turn be connected to the first network 112(1). For example, the WCDN operated by a telecommunication company may interconnect or have a peering agreement with an Internet backbone provider. As a result, a user of the second network 112(2) may be able to access resources on the first network 112(1), and vice versa.

The proxy access devices 1010 may be located at a geolocation 1002 that is different from that of the TD 106. For example, the proxy host device 1008 and attached proxy access devices 1010 may be installed at a second geolocation 1002(2), such as in another city, state, country, and so forth.

Returning to the AUT 104, as part of the testing process, the developer 102 may use the user interface 110 to access the management module 1006 of the management server 1004. From the user interface 110, the developer 102 may select one or more of a particular geolocation 1002 or particular proxy access device 1010 to use during testing. The management module 1006 may maintain information about the proxy access devices 1010, such as geolocation 1002, availability, cost, type of proxy access device 1010, and so forth.

The management module 1006 may coordinate establishment of the first connection between the AUT 104 and the proxy access device 1010 that was selected. For example, based on the selection by the developer 102, the management module 1006 may determine the proxy host device 1008 and retrieve information such as digital certificates, cryptographic credentials, network address, and so forth. In one implementation, the management module 1006 may communicate with the proxy host device 1008 to prepare the proxy host device 1008 for communication with the AUT 104. In another implementation, the management module 1006 may provide configuration data to the AUT 104, which in turn connects to the proxy host device 1008 and sends the configuration data.

During testing, the AUT traffic 114 may be routed through the first network 112(1) to the proxy host device 1008, through the proxy access device 1010 to the second network 112(2), and then on to the first network 112(1) to ultimately arrive at the destination device 116. The AUT traffic 114 may include outbound application traffic 120 and inbound application traffic 122. The outbound application traffic 120 may comprise data that is sent from the AUT 104 to the destination device 116. The inbound application traffic 122 may comprise data that is sent from the destination device 116 to the AUT 104. During operation, the AUT 104 directs the outbound application traffic 120 to the proxy host device 1008 associated with the selected proxy access device 1010. The proxy host device 1008 in turn transfers the outbound application traffic 120 to the proxy access device 1010, which then sends the outbound application traffic 120 to the second network 112(2). The second network 112(2) may then send the outbound application traffic 120 to the destination device 116. Inbound application traffic 122 from the destination device 116 may follow the reverse path.

The management server 1004 may collect log data 128 associated with operation of the system. The log data 128 may include session data 130. The proxy host device 1008 may be configured to generate the session data 130. The resulting session data 130 is representative of the real world, including the complexities and nuances associated there with.

The management server 1004 may obtain the session data 130. For example, the proxy host device 1008 may stream the session data 130 to the management server 1004 during the test session. In another example, the management server 1004 may poll the proxy host devices 1008.

Instead of, or in addition to, the session data 130, one or more deployed devices 1014 may provide deployed log data 1016 to the management server 1004. The deployed devices 1014 may include, but are not limited to, smartphones, laptops, tablet computers, embedded devices, wearable computing devices, appliances, automobiles, aircraft, and so forth. The deployed device 1014 may execute the AUT 104 that incorporates the SDK. The SDK on the deployed device 1014 may be configured to collect deployed log data 1016 during operation of the AUT 104 on the deployed device 1014. The deployed log data 1016 may comprise information indicative of, at a particular time, one or more of: the geolocation 1002 of the deployed device 1014, breadcrumb data, and other information associated with the AUT traffic 114 or the operation of the deployed device 1014. For example, the user may agree to allow for the collection of the deployed log data 1016 on the deployed device 1014. While the user is using the AUT 104, deployed log data 1016 is collected. As a result, the deployed log data 1016 comprises real-world information that is obtained from actual users using the AUT 104. The geolocation 1002 data may be obtained from a positioning device such as a GPS receiver, from a service such as a Wi-Fi hotspot geolocation lookup, from a network provider based on signal strength or time delay at several network access points 1012, and so forth.

The deployed log data 1016 may be transmitted in real time or at specified intervals to the management server 1004 or another device. For example, the AUT 104 on the deployed device 1014 may be configured to send the deployed log data 1016 in real time. Real time or near real time may comprise actions that take place within a threshold maximum amount of time. For example, the deployed log data 1016 may be deemed to be real time if collected and transmitted within 100 milliseconds (ms). In a real time or near real time configuration, the analysis server 118 may be able to quickly generate data indicative of a problem associated with the AUT 104. As a result, the developer 102 may be able to quickly mitigate problems, thus improving the user experience, optimizing use of the network(s) 112, and so forth.

During testing, the developer 102 may contemporaneously acquire the session data 130 and the deployed log data 1016. For example, the developer 102 may use the TD 106 to execute the AUT 104 and test the different geolocations 1002 while a number of users are using the deployed devices 1014.

The analysis server 118 may obtain information, such as the log data 128, from the management server 1004. In another implementation, the analysis server 118 and the management server 1004 may access the log data 128 that is stored by another system, such as a dedicated storage server.

Figure 11:
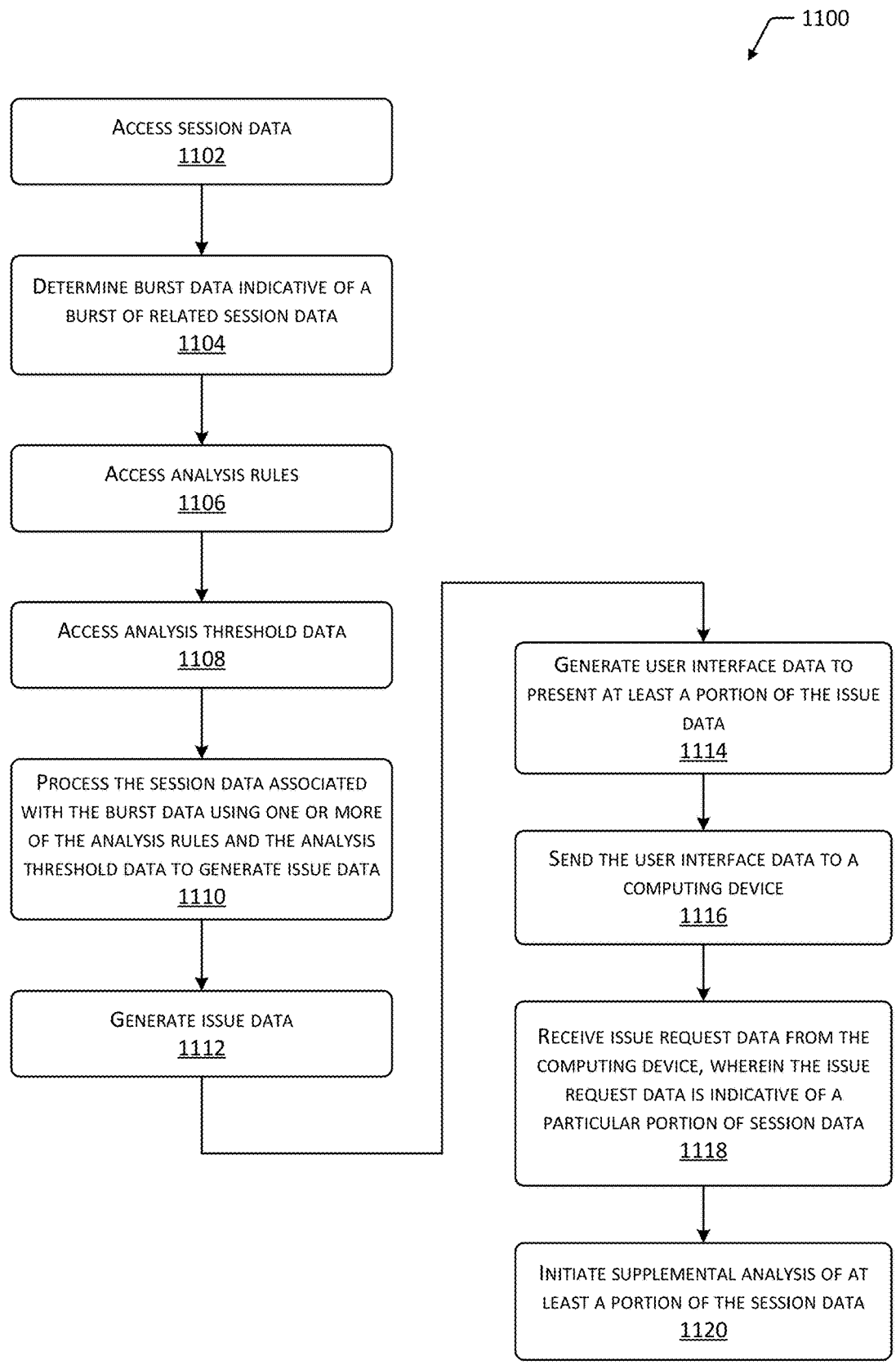
FIG. 11 is a flow diagram of a process for determining output data and providing a user interface thereof, according to one implementation.

FIG. 11 is a flow diagram 1100 of a process for determining output data 134 and providing a user interface 110 thereof, according to one implementation. The process may be implemented at least in part by one or more of the analysis server 118, the test device 106, the workstation 108, the management server 1004, or other computing devices.

At 1102, session data 130 (or other log data 128) comprising information about one or more activities 204 associated with an application under test (AUT) 104 obtained during a test is accessed. For example, the analysis module 132 may access the log data 128 stored in the memory 416.

In some implementations, the session data 130 may include one or more of the video capture data 440 of an image generated by the AUT 104 during testing, hardware metrics obtained from a computing device executing the AUT 104 such as the TD 106, operating system metrics obtained from a computing device executing the AUT 104 such as the TD 106, data exchanged between the AUT 104 and one or more destination devices 116, and so forth.

At 1104, burst data 136 indicative of a burst 214 comprising one or more of the activities 204 in the session data 130 that are deemed to be causally associated to one another is determined. For example, the techniques of FIG. 2 may be applied to group the activities 204 into bursts 214.

In one implementation, the determination of the burst data 136 may include designating a first activity 204 occurring in the session data 130 with a frequency that is less than a first threshold value. For example, this may comprise a non-random activity 204. A second activity 204 may be designated that also occurs in the session data 130 with a frequency that is less than a second threshold value. In some implementations, the first threshold value and the second threshold value may be the same.

The determination of the burst data 136 may then process these nonrandom activities 204 to determine one or more of: a first timestamp of the first activity 204 is within a threshold time window 216 of a second timestamp of the second activity 204, or a first overall time 208 of the first activity 204 overlaps with a second overall time 208 of the second activity 204. If either or both of these determinations are true, the burst data 136 may be generated that includes the first activity 204 and the second activity 204.

The time window 216 may be determined based on a round-trip time between the TD 106 and a proxy, such as the proxy access device 1010. The session data 130 may be obtained at least in part by the proxy, such as the proxy access device 1010, or another device such as the proxy host device 1008. The threshold time window 216 may be based at least in part on the round-trip time, wherein the threshold time window 216 is indicative of a time interval that is greater than or equal to the round-trip time.

At 1106, analysis rule data 304 indicative of one or more rules associated with at least a portion of the one or more activities 204 is accessed. For example, where the activity 204 involves data transfer to a remote destination device 116, the rules associated with data transfer may be retrieved from the memory 416.

At 1108, analysis threshold data 306 indicative of one or more thresholds associated with the one or more analysis rules is accessed. Continuing the example above, the thresholds associated with the rules for data transfer may be retrieved from the memory 416.

At 1110, the session data 130 associated with the burst data 136 is processed using one or more of the analysis rules or the analysis threshold data to generate issue data 138. As described above, the issue data 138 may include information indicative of one or more aspects of operation of the AUT 104 that are to be assessed for possible improvement. For example, these may be operations that exceeded a threshold amount of time, exceeded a threshold amount of bandwidth, exceeded a threshold number of concurrent connections, and so forth. Should the developer 102 inspect the issue specified by the issue data 138 they may take action to mitigate the indicated issue, which may then improve performance of the application, improve performance of the network 112, improve performance of the TD 106, and so forth.

At 1112, issue data 138 is generated. For example, the issue data 138 may be generated as described above. In one implementation, the issue data 138 may include impact data 314 that is indicative of a variance between one or more metrics of the activity 204 and the analysis threshold data 306.

At 1114, user interface data 142 comprising at least a portion of one or more of the burst data 136 or the issue data 138 is generated.

At 1116, the user interface data 142 is sent to a computing device. For example, the user interface data 142 may be sent using the network 112 to the workstation 108.

At 1118, issue request data 144 is received from the computing device. For example, the workstation 108 may send the issue request data 144 to the developer interface module 140. The issue request data 144 may be indicative of a particular portion of the log data 128, such as a particular section of session data 130 that is associated with a particular burst 214.

At 1120, based at least in part on the issue request data 144, supplemental analysis of at least a portion of the session data 130 or other log data 128 is initiated. For example, the developer interface module 140 may generate second user interface data 142 presenting at least the particular portion of the session data 130. The second user interface data 142 may be sent to one or more computing devices associated with members of the team tasked with generating issue rules. This team may analyze the log data 128 and return to the system supplemental analysis rule data. For example, the supplemental analysis rule data may include new rules, modifications to existing rules, and so forth. The developer interface module 140 may receive the supplemental analysis rule data and the analysis rule data 304 may be modified based on the supplemental analysis rule data. Continuing the example, the new rules may be added to the analysis rule data 304. Following this addition, the log data 128 or portion thereof associated with the issue request data 144 may then be reprocessed to generate issue data 138.

Figure 12:
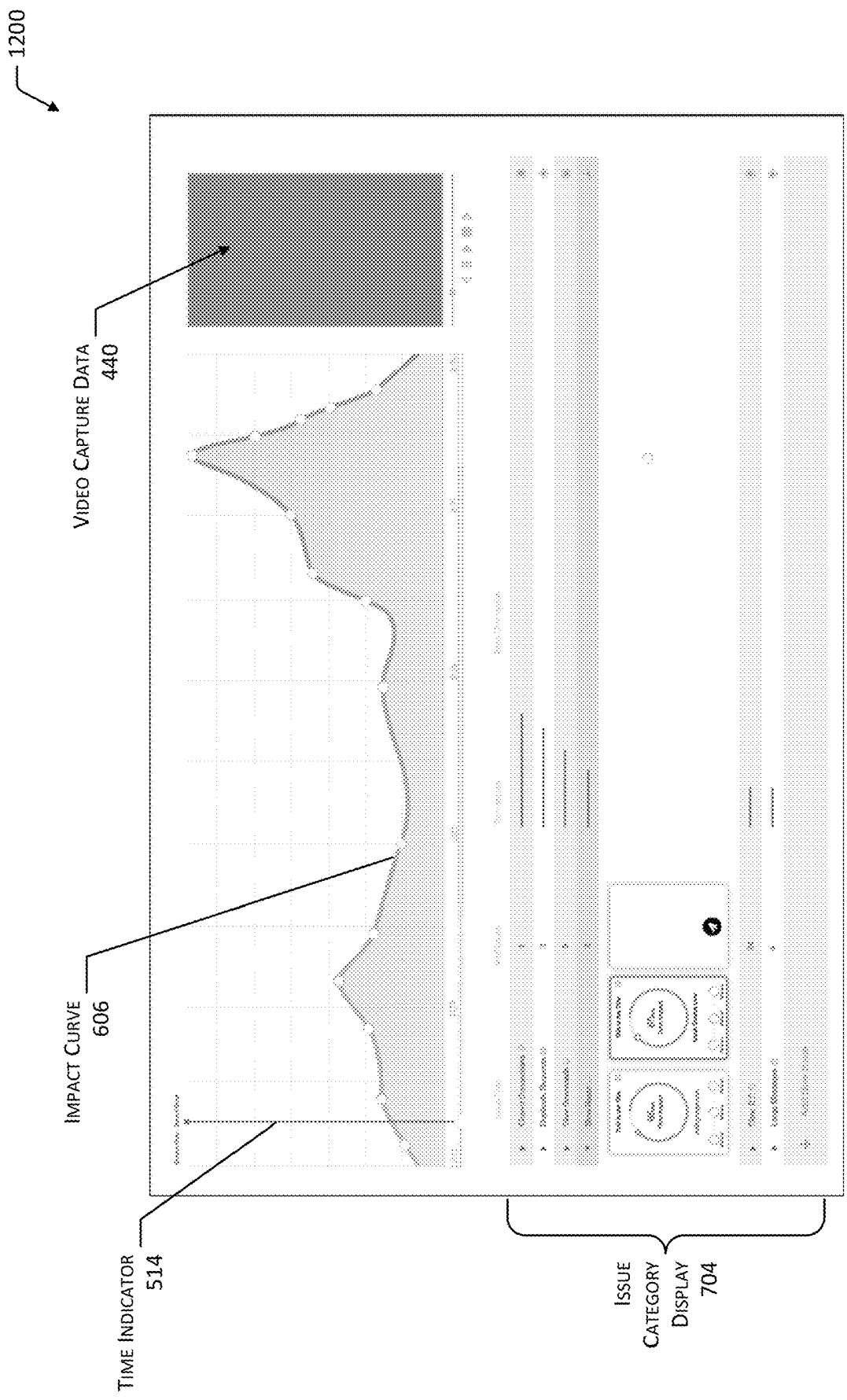
FIG. 12 illustrates a user interface depicting the impact curve, according to one implementation.

FIG. 12 illustrates a user interface 1200 depicting the impact curve 606, according to one implementation. In this illustration, a user input event has occurred with respect to the "Slow hosts" issue category. Responsive to this user input event, the issue category display 704 presents additional information about that category of issue, such as the charts depicted here. In other implementations, a waterfall display or other information may be presented.

Figure 13:
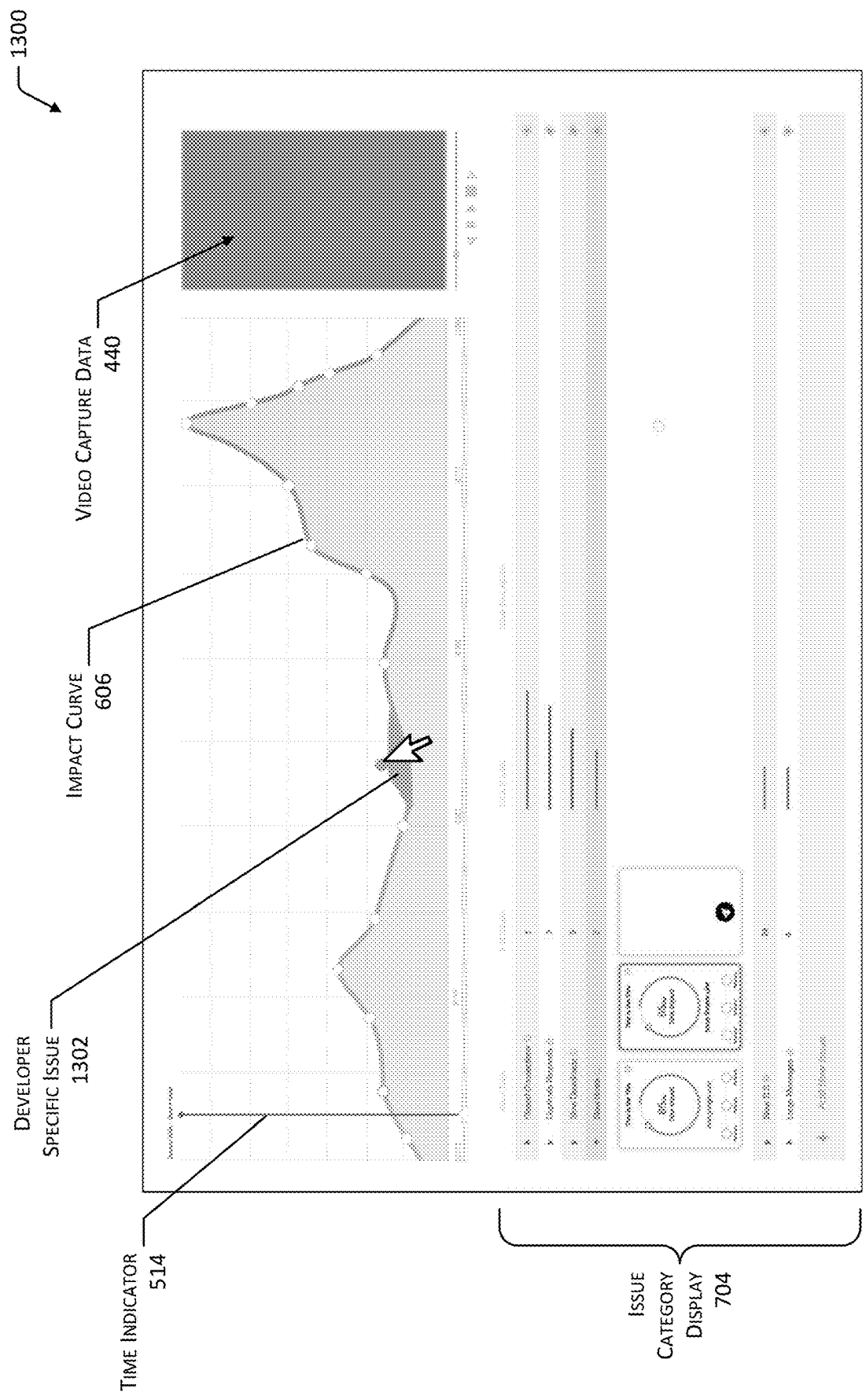
FIG. 13 illustrates a user interface in which a user can specify an issue, according to one implementation.

FIG. 13 illustrates a user interface 1300 in which a user can specify an issue, according to one implementation. In this example, the issue category display 704 includes charts to provide information about one or more metrics associated with a particular category of issue.

In some implementations, the developer 102 may scroll a cursor along the impact curve 606 to a particular point on the timeline 510. Responsive to a user input event such as keyboard entry, touch, mouse click, and so forth, issue request data 144 may be generated as described above. At the point corresponding to the cursor, the impact curve 606 may show graphical indicia, such as the developer specific issue 1302 indicated here. The graphical indicia may comprise a bulge or animated feature in which the impact curve 606 expands to include the point specified by the cursor. In some implementations, the height of this graphical indicia may be predetermined. In other implementations, the height of the graphical indicia may be specified by the developer 102, allowing indication as to severity of the issue. For example, the developer 102 may increase the height of the developer specific issue 1302 indicia to indicate the relative severity of the issue.

Figure 14:
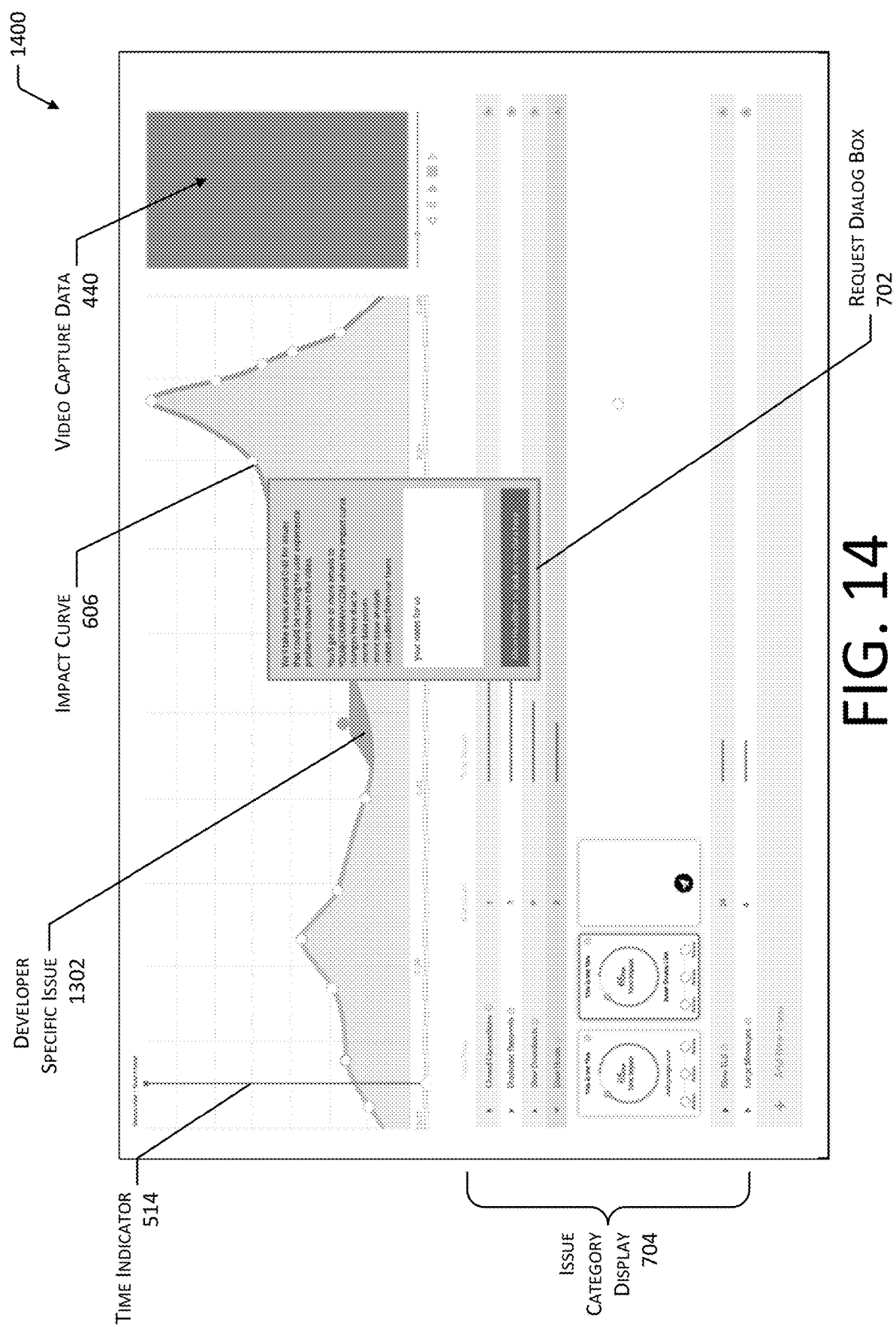
FIG. 14 illustrates a user interface in which the request dialog box is presented to acquire input from the developer after specifying an issue on the impact curve, according to one implementation.

FIG. 14 illustrates a user interface 1400 in which the request dialog box 702 is presented to acquire input from the developer 102 after specifying an issue on the impact curve 606, according to one implementation. For example, responsive to the input by the developer 102 to generate the developer specific issue 1302, the request dialog box 702 may be presented.

Figure 15:
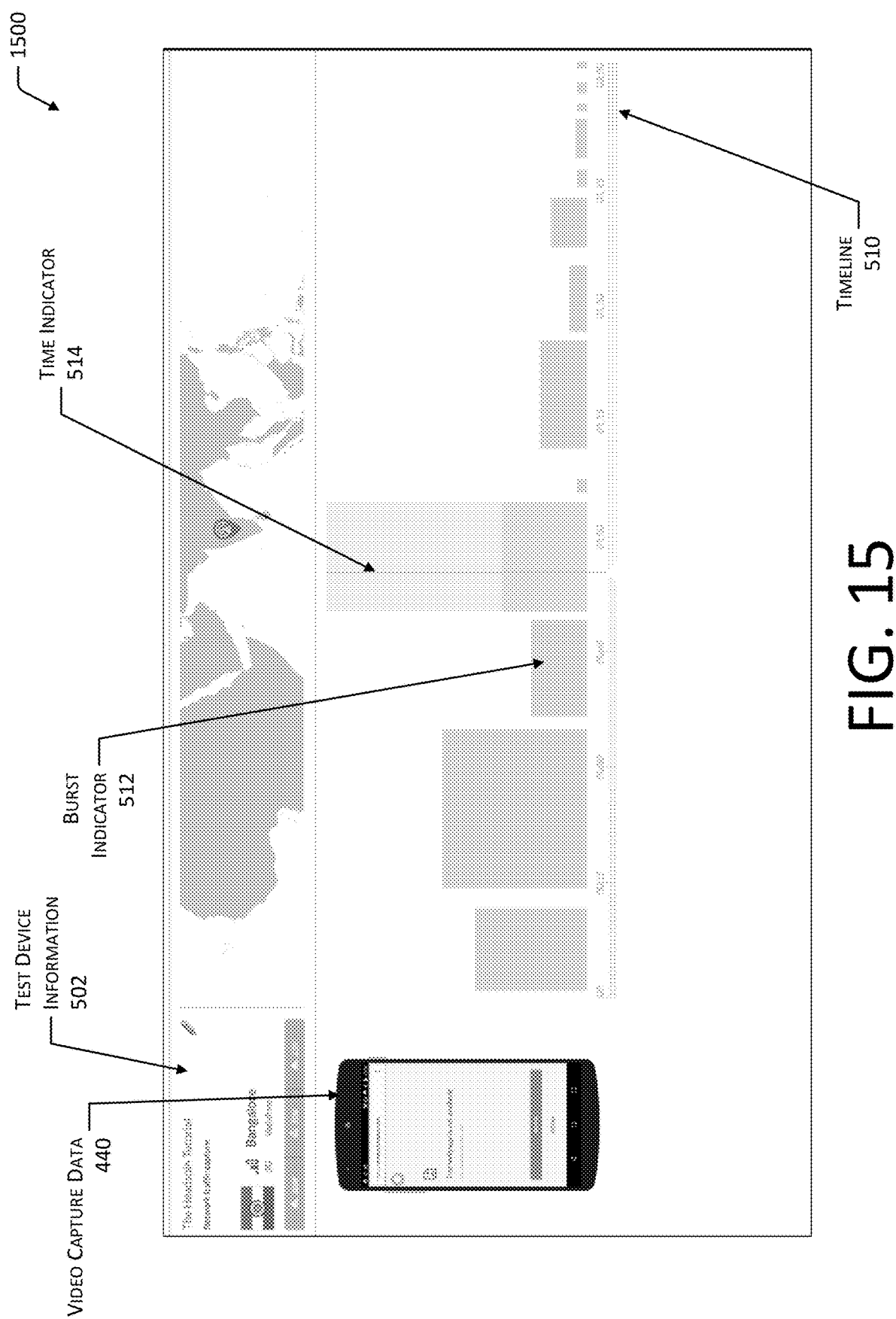
FIG. 15 illustrates a user interface depicting information based at least in part on the burst data, according to one implementation.

FIG. 15 illustrates an alternative user interface 1500 depicting information based at least in part on the burst data 136, according to one implementation. As depicted here, the user interface 1500 may include video capture data 440, test device information 502, the timeline 510, and one or more burst indicators 512.

Figure 16:
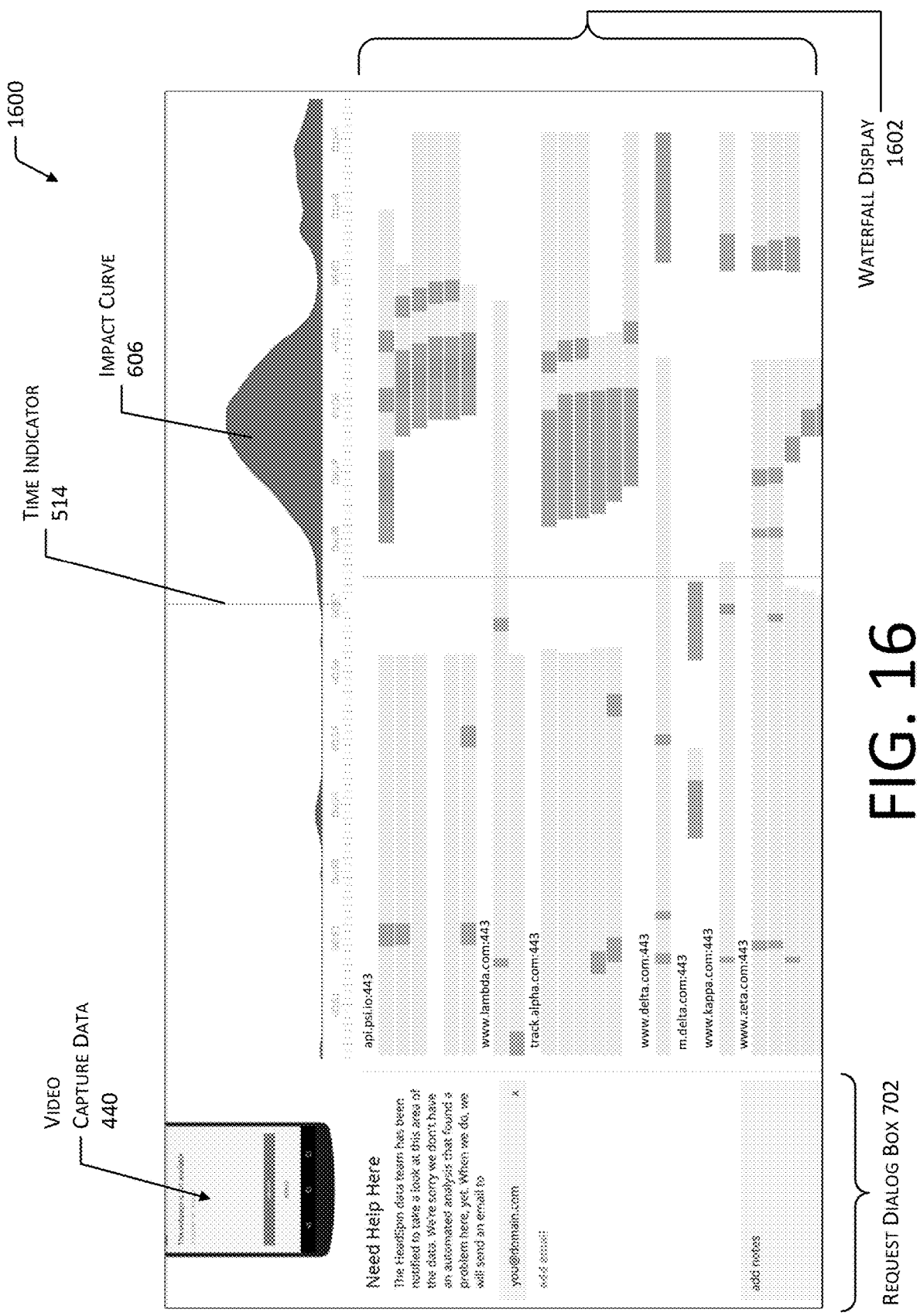
FIG. 16 illustrates a user interface depicting the impact curve and a waterfall display, according to one implementation.

FIG. 16 illustrates a user interface 1600 depicting the impact curve 606 and a waterfall display 1602, according to one implementation. Depicted in this figure is another implementation of the request dialog box 702. For example, following activation of the issue request control 612, the request dialog box 702 may be presented to obtain additional information for inclusion in the issue request data 144. Continuing the example, as depicted here, the developer 102 may add another email address or add notes to the request.

Also presented by this user interface 1600 is a waterfall display 1602. The waterfall display 1602 provides information such as the activities 204 associated with a particular host, duration of those activities 204, and so forth.

Responsive to the touch to the impact curve 606, the waterfall display 1602 may change the color or otherwise emphasize the presence of the particular issue or category of issue to more easily enable the developer 102 to spot that information within the waterfall display 1602.

In some implementations, the user input event such as a touch on a particular portion of the impact curve 606 may present additional information. For example, the touch may specify a particular issue or category of issue.

Figure 17:
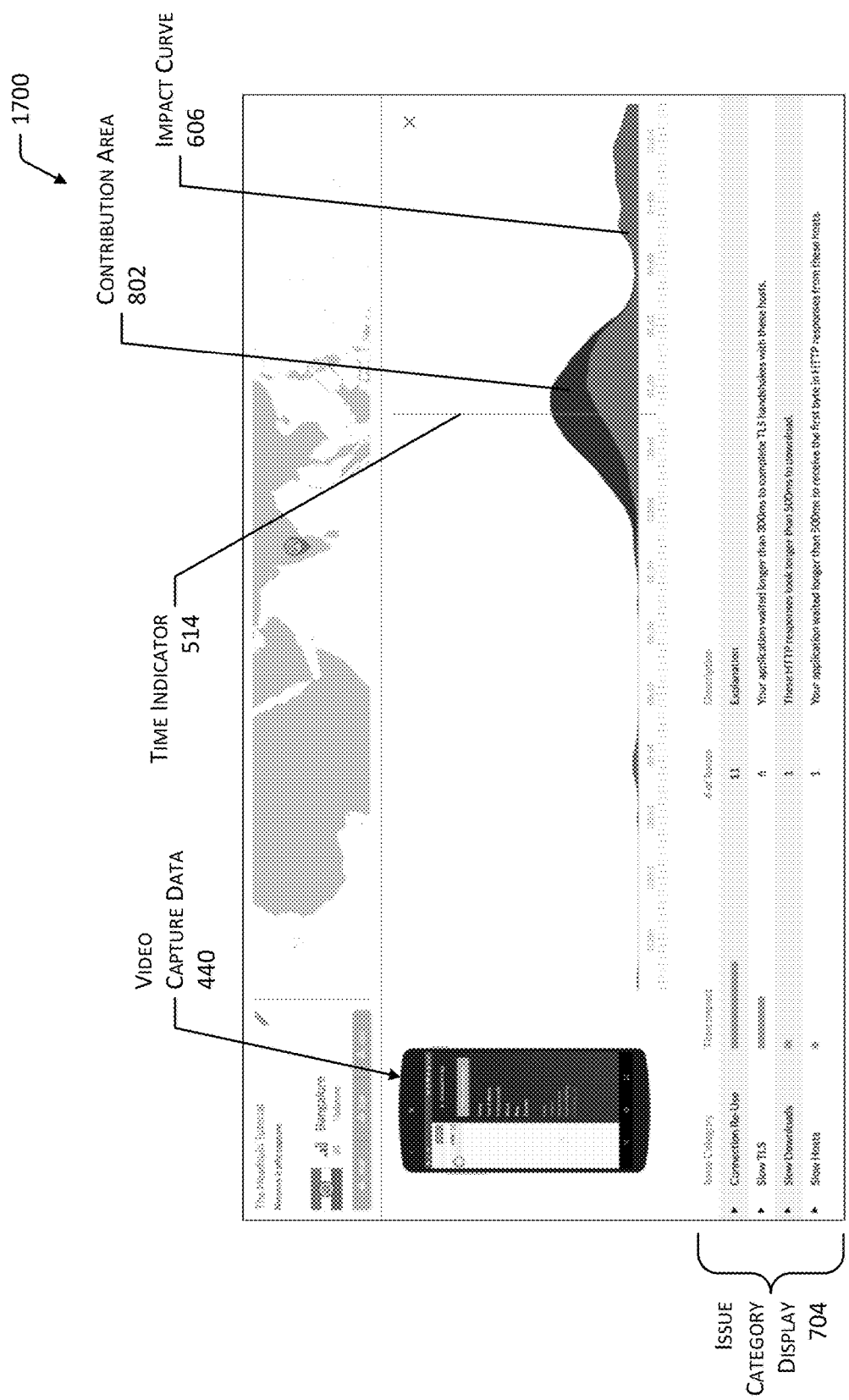
FIG. 17 illustrates a user interface depicting the impact curve and showing a contribution area associated with a particular issue, according to one implementation.

FIG. 17 illustrates a user interface 1700 depicting the impact curve 606 and showing a contribution area 802 associated with a particular issue, according to one implementation. In this figure, the contribution area 802 indicates the contribution of a particular issue or category of issue to the overall impact curve 606. For example, the contribution area 802 depicted here comprises approximately one half of the area associated with a peak of the impact curve 606. If this particular issue is resolved, there may be a significant decrease in the amplitude of the impact curve 606, which may result in improved user experience due to improved functionality of the application under test 104. By providing the contribution area 802, the developer 102 is able to more quickly determine which particular issues to address in order to provide maximum improvement in the operation of the application under test 104.

Figure 18:
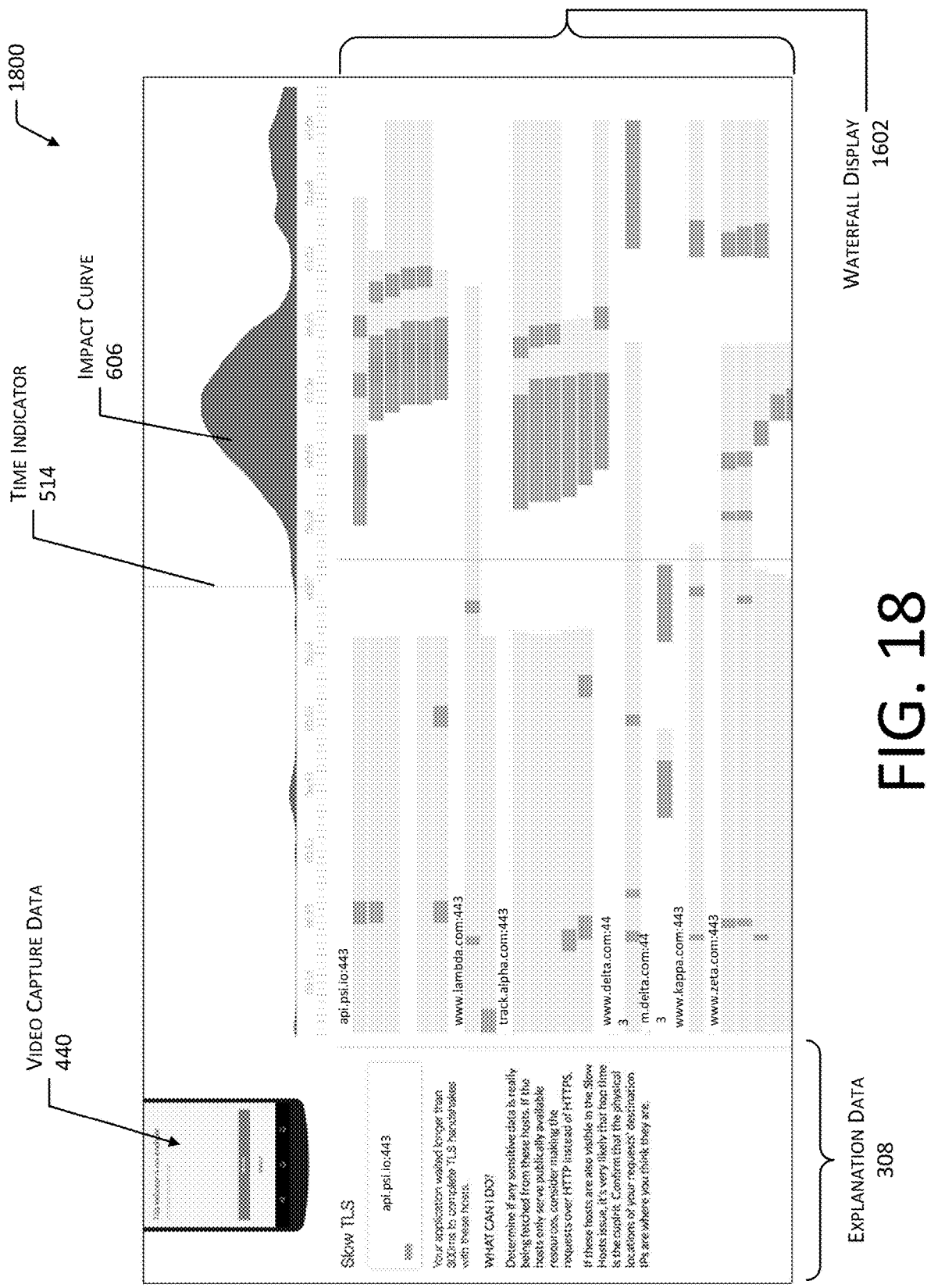
FIG. 18 illustrates a user interface depicting the impact curve and a waterfall display, according to one implementation.

FIG. 18 illustrates a user interface 1800 depicting the impact curve 606 and a waterfall display 1602, according to one implementation. In this illustration, the impact curve 606 and a waterfall display 1602 are presented. Also presented is explanation data 308 associated with a particular issue.

Figure 19:
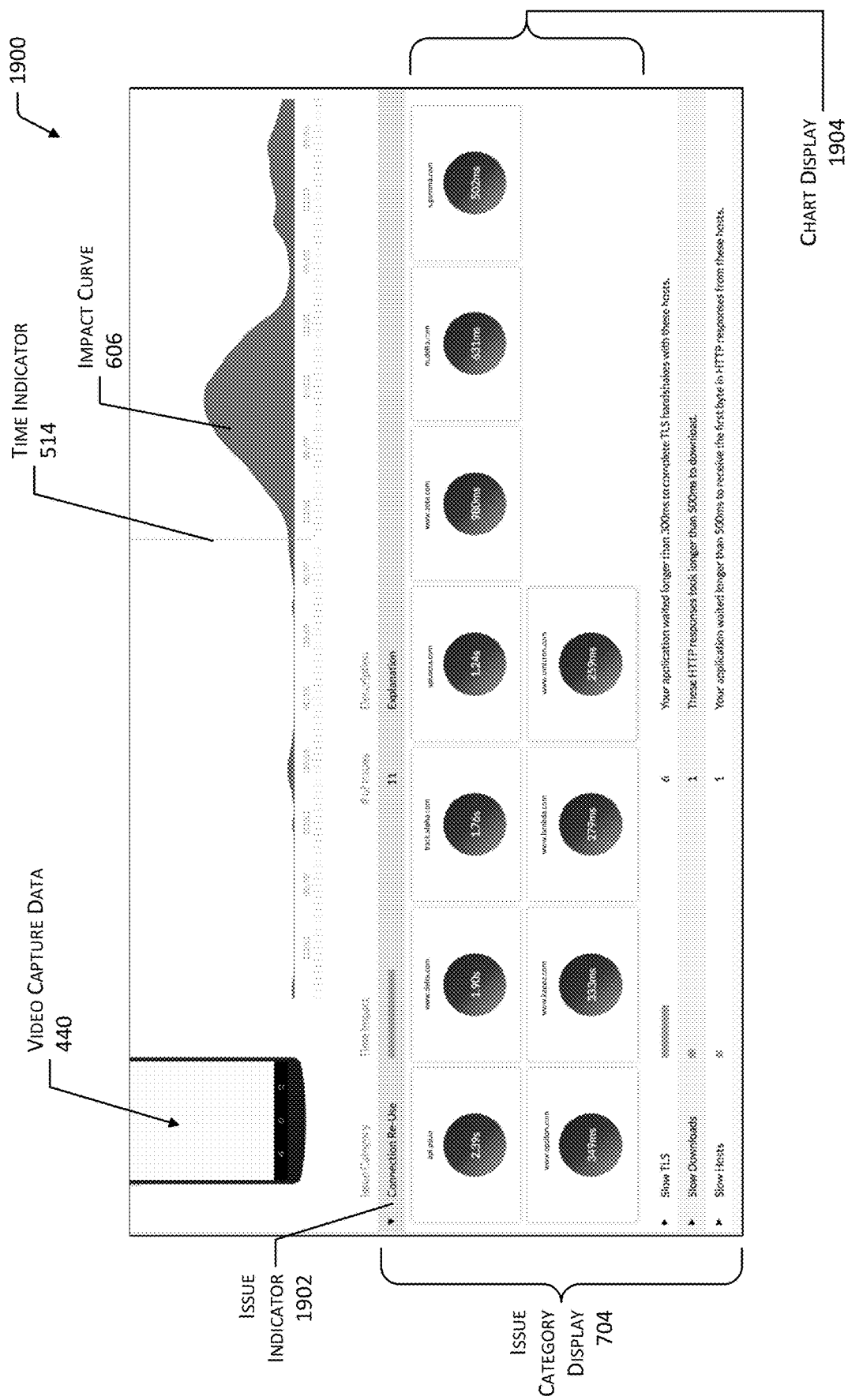
FIG. 19 illustrates a user interface depicting the impact curve and chart display showing information about a particular category of issue, according to one implementation.

FIG. 19 illustrates a user interface 1900 depicting the impact curve 606 and chart display 1904 showing information about a particular category of issue, according to one implementation. Depicted in this illustration is the video capture data 440 and the impact curve 606. An issue category display 704 is presented that includes presentation of one or more issue indicators 1902. The user may provide a user input event, such as a click on the issue indicator 1902 to access additional information such as a chart display 1904. In this illustration, the developer 102 may have tapped on the issue indicator 1902 designated "Connection Re-Use" and now is presented with the information about the impact time associated with connections to various hosts on the network 112. In other implementations, other information may be presented, such as total last time, quantity of data transferred, and so forth.

A variety of different navigational pathways may be taken to access the various user interfaces and elements described above. For example, the burst presentation 506 may be presented. Responsive to a user input event that selects a particular burst indicator 512, the user interface may then present the issue presentation 602 that includes the impact curve 606. Selection of a point on the impact curve 606 or a category of issue may then result in the presentation of the waterfall display 1602.

By using the system, techniques, and user interfaces described above, developers 102 are better able to utilize information about the performance of an application. This information may be used to improve performance of the application, optimize usage of a network 112, improve user experience, determine problems associated with the network 112, and so forth. For example, network usage may be optimized by detecting issues that could result in consolidated connections, reductions in the quantity of data transferred, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
   one or more memories storing computer-executable instructions; and
   one or more hardware processors to execute the computer-executable instructions to:
   access first data comprising information about one or more activities associated with an application under test (AUT);
   determine second data indicative of a burst comprising the one or more activities in the first data that are deemed to be associated with one another;
   access third data comprising images generated during execution of the application during at least a portion of the test;
   synchronize the third data with the first data; and
   generate fourth data based on the first data associated with the second data and the synchronization of the third data with the first data, wherein the fourth data is indicative of one or more issues occurring during the test.

2. The device of claim 1, the determination of the second data further comprising computer-executable instructions to:
   determine a first activity occurring in the first data with a frequency that is less than a first threshold value;
   determine a second activity occurring in the first data with a frequency that is less than a second threshold value;
   determine one or more of:
   a first timestamp of the first activity is within a threshold time window of a second timestamp of the second activity, or
   a first overall time of the first activity overlaps with a second overall time of the second activity; and
   generate the second data including the first activity and the second activity.

3. The device of claim 2, further comprising the one or more hardware processors to execute the computer-executable instructions to:
   determine a round-trip time between the device and a proxy, wherein the first data is obtained at least in part by the proxy; and
   determine the threshold time window based at least in part on the round-trip time, wherein the threshold time window is indicative of a time interval that is greater than or equal to the round-trip time.

4. The device of claim 1, wherein the fourth data comprises one or more of:
   fifth data indicative of a variance between one or more metrics of an activity and analysis threshold data, or
   sixth data indicative of how to reduce the variance.

5. The device of claim 1, further comprising the one or more hardware processors to execute the computer-executable instructions to:
   generate user interface data comprising at least a portion of one or more of: the second data or the fourth data; and
   send the user interface data to a second device.

6. The device of claim 1, further comprising the one or more hardware processors to execute the computer-executable instructions to:
   receive fifth data associated with a particular portion of the first data;
   generate user interface data presenting at least the particular portion of the first data;
   send the user interface data to one or more devices; and
   determine sixth data indicative of one or more thresholds associated with one or more analysis rules.

7. The device of claim 1, wherein the one or more activities comprise communication between the AUT and one or more devices during a test; and
   further comprising the one or more hardware processors to execute the computer-executable instructions to:
   obtain fifth data indicative of video of the AUT during the test; and
   associate the fifth data with the first data.

8. A method comprising:
   accessing first data comprising information about one or more activities associated with an application obtained during a test;
   determining second data indicative of a burst comprising the one or more activities in the first data that are deemed to be associated with one another;
   accessing third data comprising images generated during execution of the application during at least a portion of the test;
   synchronizing the third data with the first data;
   generating fourth data based on the first data associated with the second data and the synchronization of the third data with the first data, wherein the fourth data is indicative of one or more issues occurring during the test; and generating user interface data to present information based at least in part on the second data indicative of the burst and the fourth data indicative of the one or more issues.

9. The method of claim 8, further comprising:
determining a union of time associated with each of the one or more activities of the second data;
determining a sum of data transferred by the one or more activities of the second data; and
wherein the user interface data is further configured to present a graphical representation of the second data comprising a rectangle having a width based on the union of time and a height based on the sum of data transferred.

10. The method of claim 9, further comprising:
determining a variance between one or more metrics associated with one of the one or more activities and an analysis threshold; and
wherein the user interface data further comprises instructions to generate a graphical representation of the variance.

11. The method of claim 8, the determining the second data comprising:
determining a first activity occurring in the first data with a frequency that is less than a first threshold value;
determining a second activity occurring in the first data with a frequency that is less than a second threshold value;
determining one or more of:
a first timestamp of the first activity is within a threshold time window of a second timestamp of the second activity, or
a first overall time of the first activity overlaps with a second overall time of the second activity; and
generating the second data to include at least the first activity and the second activity.

12. The method of claim 8, further comprising:
establishing a connection between a proxy and a proxy host device at a first geolocation;
establishing communication between the proxy and a device at a second geolocation that is executing the application;
sending, via the connection, communications between the application and a server using the proxy host device; and
receiving at least a portion of the first data from the proxy.

13. The method of claim 8, wherein the first data comprises one or more of:
video capture of images generated by the application during testing,
hardware metrics obtained from a computing device executing the application,
operating system metrics obtained from the computing device executing the application, or
data exchanged between the application and one or more destination devices.

14. The method of claim 8, further comprising:
receiving fifth data indicative of user input from a user interface; and
generating second user interface data indicative of the third data.

15. A method comprising:
accessing first data comprising information about one or more activities associated with an application obtained during a test that is executing on a first device;
accessing second data comprising images generated during execution of the application during at least a portion of the test;
determining third data indicative of a burst comprising the one or more activities in the first data that are deemed to be associated with one another;
synchronizing the first data with the second data;
generating fourth data based on the synchronization of the first data and the second data, wherein the fourth data is indicative of one or more issues occurring during the test; and
generating user interface data to present information based at least in part on the third data indicative of the burst and the fourth data indicative of the one or more issues.

16. The method of claim 15, further comprising:
establishing a connection between the application executing on the first device and a second device via proxy;
receiving the first data from the proxy;
determining a round-trip time between the first device and the proxy;
determining a threshold time window based at least in part on the round-trip time, wherein the threshold time window is indicative of a time interval that is greater than or equal to the round-trip time; and
wherein determining the third data comprises:
determining a first timestamp of a first activity is within the threshold time window of a second timestamp of a second activity; and
generating the third data including the first activity and the second activity.

17. The method of claim 15, further comprising:
determining a union of time spent performing each of the one or more activities of the third data;
determining a sum of fifth data transferred by the one or more activities of the third data; and
the user interface data further configured to present a graphical representation of the third data, the graphical representation comprising a rectangle having a width based on the union of time and a height based on the sum of the fifth data transferred.

18. The method of claim 15, further comprising:
determining a metric value of one or more of the one or more activities;
comparing the metric value with threshold data; and
the user interface data further configured to present an issue indicator based on the comparison.

19. The method of claim 15, further comprising:
accessing source code of the application;
determining a correspondence between a portion of the source code and at least a portion of the first data; and
presenting the portion of the source code contemporaneously with presenting the fourth data.

20. The method of claim 15, further comprising:
establishing a connection between a proxy and a proxy host device at a first geolocation;
establishing communication between the proxy and a device at a second geolocation that is executing the application;
sending, via the connection, communications between the application and a server using the proxy host device; and
receiving at least a portion of the first data from the proxy.

* * * * *